United States Patent
Vasyltsov et al.

(10) Patent No.: US 10,417,407 B2
(45) Date of Patent: Sep. 17, 2019

(54) METHOD FOR SECURE SYNCHRONIZATION AND PAIRING BETWEEN DEVICES AND APPARATUS USING THE METHOD

(71) Applicant: SAMSUNG ELECTRONICS CO., LTD., Suwon-si (KR)

(72) Inventors: Ihor Vasyltsov, Yongin-si (KR); Chang-gyu Bak, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 240 days.

(21) Appl. No.: 15/459,147

(22) Filed: Mar. 15, 2017

(65) Prior Publication Data

US 2018/0025146 A1  Jan. 25, 2018

(30) Foreign Application Priority Data

Jul. 20, 2016  (KR) .................. 10-2016-0091993

(51) Int. Cl.
*G06F 21/34*  (2013.01)
*G06F 21/32*  (2013.01)
(Continued)

(52) U.S. Cl.
CPC .............. *G06F 21/34* (2013.01); *G06F 21/32* (2013.01); *G06F 21/35* (2013.01); *H04L 9/0866* (2013.01); *H04L 2209/88* (2013.01)

(58) Field of Classification Search
CPC ...................................................... G06F 21/34
See application file for complete search history.

(56) References Cited

U.S. PATENT DOCUMENTS

2006/0215883 A1  9/2006  Kim et al.
2008/0216171 A1  9/2008  Sano et al.
(Continued)

FOREIGN PATENT DOCUMENTS

EP        2698686 A2     2/2014
JP     2008-198028 A     8/2008
(Continued)

OTHER PUBLICATIONS

Sriram Cherukuri, et al., "BioSec: A Biometric Based Approach for Securing Communication in Wireless Networks of Biosensors Implanted in the Human Body", Proceedings of the 2003 International Conference on Parallel Processing Workshops (ICPPW'03), 2003 IEEE, The Computer Society, total 8 pages.
(Continued)

*Primary Examiner* — Simon P Kanaan
(74) *Attorney, Agent, or Firm* — Sughrue Mion, PLLC

(57) ABSTRACT

An electronic device includes a biomedical sensor configured to generate a first signal by detecting a biomedical signal, a motion sensor configured to generate a second signal by detecting a motion, and a communication interface configured to provide a secure communication channel with another electronic device, and receive a third signal through the secure communication channel. The electronic device further includes a controller configured to generate a secret key for the secure communication channel, based on the first signal, and determine whether to perform a predetermined function, based on the second signal and the received third signal.

17 Claims, 21 Drawing Sheets

(51) Int. Cl.
*G06F 21/35* (2013.01)
*H04L 9/08* (2006.01)

(56) References Cited

U.S. PATENT DOCUMENTS

| | | |
|---|---|---|
| 2013/0321263 A1 | 12/2013 | Ho |
| 2014/0028546 A1 | 1/2014 | Jeon et al. |
| 2014/0082720 A1* | 3/2014 | Markel .................. G06F 21/44 726/16 |
| 2014/0160078 A1 | 6/2014 | Seo et al. |
| 2015/0074797 A1 | 3/2015 | Choi et al. |
| 2015/0077377 A1 | 3/2015 | Han et al. |
| 2015/0084867 A1 | 3/2015 | Gorelik et al. |
| 2015/0121514 A1 | 4/2015 | Park et al. |
| 2015/0182160 A1 | 7/2015 | Kim et al. |
| 2016/0050308 A1 | 2/2016 | Liu et al. |
| 2016/0103985 A1 | 4/2016 | Shim et al. |
| 2017/0142109 A1* | 5/2017 | Mandal .................. G06F 21/32 |

FOREIGN PATENT DOCUMENTS

| | | |
|---|---|---|
| JP | 5466955 B2 | 4/2014 |
| KR | 10-2016-0025940 A | 3/2016 |

OTHER PUBLICATIONS

Wolfgang Killmann, et al., " A proposal for: Functionality classes for random number generators", Version 2.0, Sep. 18, 2011, AIS 20 / AIS 31, total 133 pages.

* cited by examiner

METHOD FOR SECURE SYNCHRONIZATION AND PAIRING BETWEEN DEVICES AND APPARATUS USING THE METHOD

CROSS-REFERENCE TO RELATED APPLICATION

This application claims priority from Korean Patent Application No. 10-2016-0091993, filed on Jul. 20, 2016, in the Korean Intellectual Property Office, the disclosure of which is incorporated herein by reference in its entirety.

BACKGROUND

1. Field

Methods and apparatuses with example embodiments relate to secure synchronization and pairing between devices, and more particularly, to a method for secure synchronization and pairing between devices, based on biomedical signals and motion signals, and an apparatus using the method.

2. Description of Related Art

Portable electronic devices have been used for extensive purposes as they have various functions and performance thereof has improved. The portable electronic devices may provide convenient functions to users by communicating with another electronic device or a system including the same, for example, a wearable electronic apparatus, an earphone, a home appliance, an automobile, etc.

The portable electronic devices may support functions that require user authentication, like banking or payment, among various functions, or may store data included in a user's privacy region. Thus, the portable electronic devices may block an inappropriate access of users who are not the true users to data of which security is needed, and the true users may have access to the data of which security is needed through authentication. Such user authentication has to maintain high security with respect to an inappropriate access and to be conveniently executed by the true users of the portable electronic devices.

SUMMARY

According to example embodiments, an electronic device includes a biomedical sensor configured to generate a first signal by detecting a biomedical signal, a motion sensor configured to generate a second signal by detecting a motion, and a communication interface configured to provide a secure communication channel with another electronic device, and receive a third signal through the secure communication channel. The electronic device further includes a controller configured to generate a secret key for the secure communication channel, based on the first signal, and determine whether to perform a predetermined function, based on the second signal and the received third signal.

According to example embodiments, a method that is performed by an electronic device, includes generating a first signal by detecting a biomedical signal, generating a second signal by detecting a motion, providing a secure communication channel with another electronic device, and receiving a third signal through the secure communication channel. The method further includes generating a secret key for the secure communication channel, based on the first signal, and determining whether to perform a predetermined function, based on the second signal and the received third signal.

According to example embodiments, an electronic device includes a biomedical sensor configured to generate a biomedical signal, a motion sensor configured to generate a first motion signal, and a communication interface configured to provide a secure communication channel with another electronic device, and receive a second motion signal from the other electronic device through the secure communication channel. The electronic device further includes a controller configured to generate a secret key for the secure communication channel, based on the biomedical signal, enter a lock mode of the electronic device, decode the received second motion signal, using the secret key, determine whether the first motion signal is identical to the decoded second motion signal, and release the lock mode in response to the determination that the first motion signal is identical to the decoded second motion signal.

DETAILED DESCRIPTION

Figure 1:
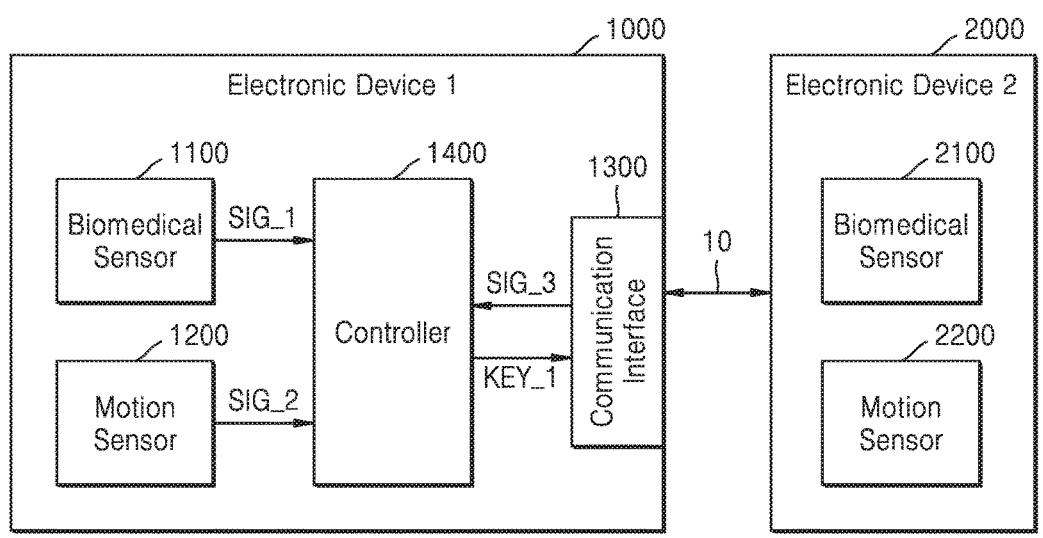
FIG. 1 is a block diagram of an electronic device according to an example embodiment.

FIG. 1 is a block diagram of an electronic device according to an example embodiment. As illustrated in FIG. 1, a first electronic device 1000 and a second electronic device 2000 may communicate with each other via a secure communication channel 10. The secure communication channel 10 may refer to a communication channel for transmission of data encoded using a secret key. The secure communication channel 10 may be formed by a wired communication method, whereby communication is performed via a medium, such as an electrical conductor or optical cable, or a wireless communication method, whereby information are moved through the air using radio frequency (RF), light, a magnetic field, an electric field, or sound, etc. For example, the secure communication channel 10 may be formed by wireless fidelity (Wi-Fi), Bluetooth, Zigbee, wireless universal serial bus (USB), and near field communication (NFC), etc., which are non-limiting examples. Although FIG. 1 illustrates only two electronic devices 1000 and 2000, three or more electronic devices may also form a secure communication channel, and it will be understood that the example embodiments that will be described below are applicable to the case in which three or more electronic devices communicate with one another.

The first and second electronic devices 1000 and 2000 may be portable electronic devices, such as personal computers (PCs), tablet PCs, mobile phones, smartphones, e-readers, personal digital assistants (PDAs), enterprise digital assistants (EDAs), digital still cameras, digital video cameras, portable multimedia players (PMPs), personal navigation devices or portable navigation devices (PNDs), or handheld game consoles, which are non-limiting examples. Also, the first and second electronic devices 1000 and 2000 may be wearable devices that are attached to a user's body and perform a computing operation, or a gloves, glasses, goggles, a helmet, an armband, a watch, a ring, a necklace, etc, which are non-limiting examples. In addition, one of the first and second electronic devices 1000 and 2000 may be a home appliance, such as a refrigerator or television (TV), or an electronic component embedded in a transportation unit, such as an automobile, a bicycle, a motorcycle, etc.

Referring to FIG. 1, the first electronic device 1000 may include a biomedical sensor 1100, a motion sensor 1200, a communication interface 1300, and a controller 1400, and the second electronic device 2000 may include a biomedical sensor 2100 and a motion sensor 2200.

The biomedical sensor 1100 may generate a first signal SIG_1 by detecting a biomedical signal of a user of the first electronic device 1000. The biomedical signal may refer to a signal used to acquire information from a living person or animal. In many physiological processes performed on a body of a person or animal, the biomedical signal having various shapes including a biomedical chemical signal, an electrical signal, and a physical signal, etc. For example, the biomedical signal may include photoplethysmogram (PPG), electroencephalogram (EEG), electromyogram (EMG), electrooculogram (EOG), electroretinogram (ERG), electrogastrogram (EGG), electrocardiogram (ECG), electrodermal activity (EDA), heart rate variability (HRV), temperature, etc. The biomedical signal may be used to acquire inherent information of the user or to determine whether the user's body is abnormal. The biomedical sensor 1100 may include a biomedical signal sensor that detects a biomedical signal or two or more biomedical signal sensors that detect different biomedical signals, as will be described below with reference to FIG. 2. The biomedical sensor 2100 of the second electronic device 2000 may operate in the same or similar way to that of the biomedical sensor 1100 of the first electronic device 1000, and detailed descriptions of the biomedical sensor 1100 will be described below with reference to FIG. 2.

The motion sensor 1200 may generate a second signal SIG_2 by detecting a motion of the first electronic device 1000. For example, the motion sensor 1200 may include an accelerometer and/or a gyroscope and may generate the second signal SIG_2 by detecting the motion of the first electronic device 1000, for example, rotation, movement, etc. The motion sensor 2200 of the second electronic device 2000 may operate in the same or similar way to the motion sensor 1200 of the first electronic device 1000.

According to an example embodiment, the first and second electronic devices 1000 and 2000 may use the biomedical sensors 1100 and 2100 and the motion sensors 1200 and 220 to be synchronized with or paired with each other based on the biomedical signal and the motion signal. That is, the first and second electronic devices 1000 and 2000 may provide high security by using the biomedical signal detected from the user, may determine whether motions applied by the user to the first and second electronic devices 1000 and 2000 are substantially identical to each other, such that inappropriate spoof (for example, fingerprint, face, etc.) may be blocked based on motility of the motions and the user's laborious action is not required and thus high convenience may be provided. In addition, the biomedical signal and the motions may be properly combined with each other, or other data may be additionally combined with each other so that a security level may be easily adjusted. Thus, the first and second electronic devices 1000 and 2000 according to the example embodiment may provide improved security, easiness, flexibility, scalability, and seamlessness simultaneously when the user uses the first and second electronic devices 1000 and 2000. Hereinafter, example embodiments in which the biomedical signal and the motions are utilized, will be described The communication interface 1300 may provide the secure communication channel 10 with the second electronic device 2000. As described above, the secure communication channel 10 may be formed using various communication methods, and the communication interface 1300 may provide the secure communication channel 10 by supporting these communication methods. The communication interface 1300 may encode data using a first secret key KEY_1 received from the controller 1400 to transmit the encoded data to the second electronic device 2000 and may decode the data received from the second electronic device 2000 using the first secret key KEY_1 to transmit the decoded data to another element (for example, the controller 1400) of the first electronic device 1000.

As illustrated in FIG. 1, the communication interface 1300 may decode the data received from the second electronic device 2000 using the first secret key KEY_1 via the secure communication channel 10 to generate a third signal SIG_3 and to provide the third signal SIG_3 to the controller 1400. For example, the third signal SIG_3 may be a signal generated when the motion sensor 2200 of the second electronic device 2000 detects a motion applied to the second electronic device 2000.

The controller 1400 may receive the first signal SIG_1 from the biomedical sensor 1100, the second signals SIG_2 from the motion sensor 1200, and the third signal SIG_3 from the communication interface 1300. The controller 1400 may include a plurality of logic circuits, or a memory for storing commands and a processor for executing the commands.

According to the example embodiment, the controller 1400 may generate the first secret key KEY_1 for the secure communication channel 10 based on the first signal SIG_1. That is, the first electronic device 1000 may establish the secure communication channel 10 based on the detected biomedical signal. Similarly, the second electronic device 2000 may generate a second secret key based on the biomedical signal detected by the biomedical sensor 2100. The first and second electronic devices 1000 and 2000 may generate the first secret key KEY_1 and the second secret key from the same user's biomedical signal, thereby generating a common secret key. That is, to establish the secure communication channel 10, the first and second electronic devices 1000 and 2000 may generate a common secret key by themselves without the need of transmitting or receiving a secret key. Thus, the secure communication channel 10 having high security may be formed between the first and second electronic devices 1000 and 2000.

Also, the controller 1400 may determine whether to perform a predetermined based on the second signal SIG_2 and the third signal SIG_3. That is, the controller 1400 may determine whether to perform a predetermined function based on the motion detected by the first electronic device 1000 and the motion detected by the second electronic device 2000. Differently from a method that uses the user's labor, like pattern recognition, face recognition, fingerprint recognition, etc., the controller 1400 may provide improved convenience to the user by using the motions applied to the first and second electronic devices 1000 and 2000. For example, when the first electronic device 1000 is a mobile phone and the second electronic device 2000 is a wearable device, such as a watch, if the user picks up the first electronic device 1000 with his/her hand holding the second electronic device 2000, the first and second electronic devices 1000 and 2000 may detect the same motion, and the first or second electronic device 1000 or 2000 may perform the predetermined function, for example, releasing of a locking mode, releasing of a sleep mode, etc. Detailed descriptions of the controller 1400 will be described below with reference to FIG. 3.

Figure 2:
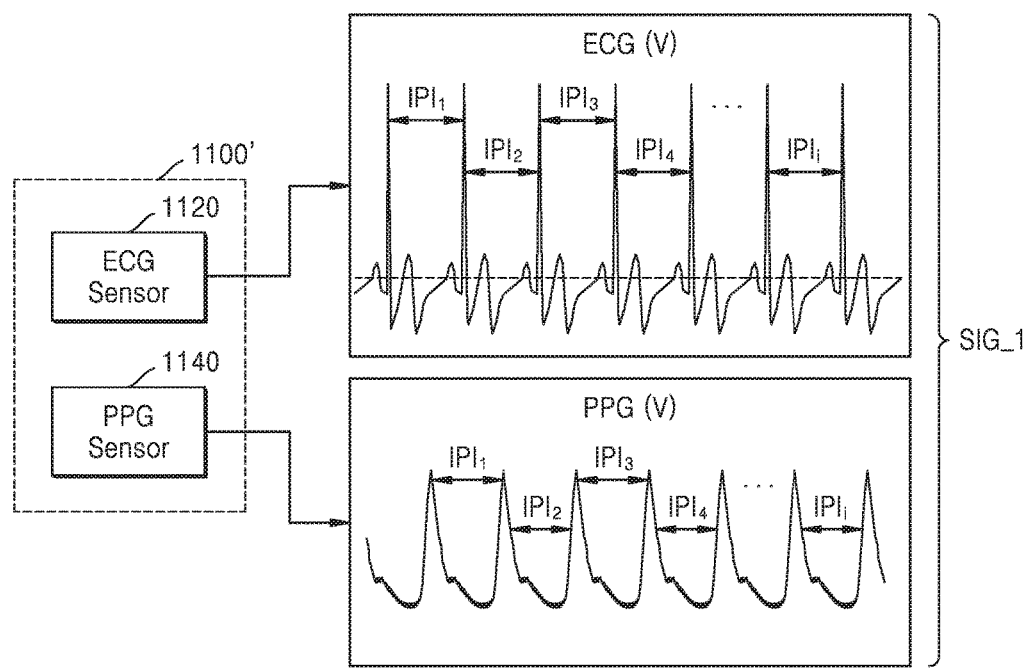
FIG. 2 is a diagram of a biomedical sensor and a first signal, according to an example embodiment.

FIG. 2 is a diagram of a biomedical sensor 1100' and the first signal SIG_1, according to an example embodiment. As described above with reference to FIG. 1, the biomedical sensor 1100' may generate the first signal SIG_1 by detecting the biomedical signal of the user of the first electronic device 1000. Referring to FIG. 2, the biomedical sensor 1100' may include an ECG sensor 1120 and a PPG sensor 1140.

The ECG sensor 1120 may generate a continuous ECG signal, and the PPG sensor 1140 may generate a continuous PPG signal, and the generated ECG signal and PPG signal may constitute the first signal SIG_1. As illustrated in FIG. 2, according to an example embodiment, a series of inter-pulse intervals (IPIs) $IPI_1$, $IPI_2$, $IPI_3$, ..., and $IPI_i$ may be extracted from the ECG signal and the PPG signal, and the first secret key KEY_1 of FIG. 1 may be generated based on the extracted series of IPIs, i.e., $IPI_1$, $IPI_2$, $IPI_3$, ..., and $IPI_i$. Because the IPIs can be measured from any part of the human body and can be extracted from various biomedical signals, the first and second electronic devices 1000 and 2000 of FIG. 1 may generate a common secret key for the secure communication channel 10 based on the series of IPIs, i.e., $IP_1$, $IP_2$, $IP_3$, ..., and $IPI_i$.

Although FIG. 2 illustrates that the biomedical sensor 1100' includes two biomedical sensors 1120 and 1140 that detect the ECG signal and the PPG signal, the biomedical sensor 1100 of FIG. 1 may also include three or more biomedical signal sensors that detect the same or different ECG and PPG signals of FIG. 2. In addition, it will be also understood that different features from the IPIs of FIG. 2 may be extracted from the detected biomedical signals and the first secret key KEY_1 of FIG. 1 may be generated from the extracted features.

Figure 3:
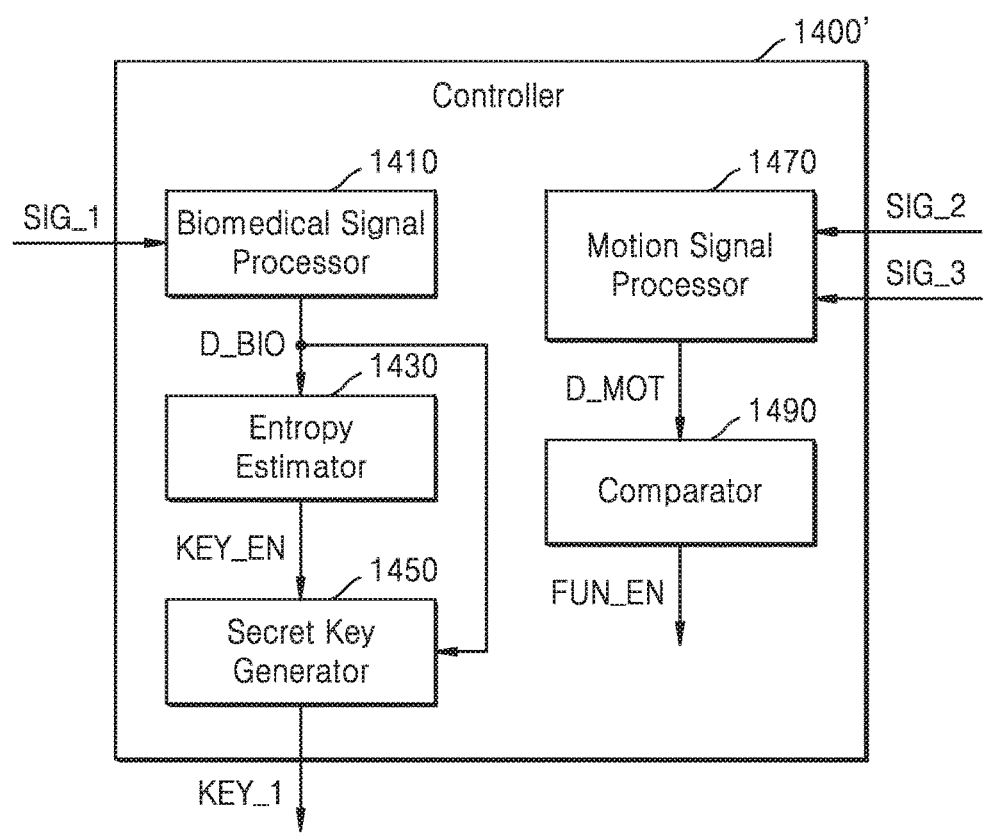
FIG. 3 is a block diagram of a controller according to an example embodiment.

FIG. 3 is a block diagram of a controller 1400' according to an example embodiment. As described above with reference to FIG. 1, the controller 1400' may receive first through third signals SIG_1 to SIG_3, may generate a first secret key KEY_1 based on the first signal SIG_1, and may determine whether to perform a predetermined function based on the second signal SIG_2 and the third signal SIG_3. Referring to FIG. 3, the controller 1400' may include a biomedical signal processor 1410, an entropy estimator 1430, a secret key generator 1450, a motion signal processor 1470, and a comparator 1490. Each of elements of the controller 1400' may be a hardware block including a logic circuit, or a software block including a plurality of commands.

The biomedical signal processor 1410 may receive the first signal SIG_1 and may generate biomedical data D_BIO by processing the first signal SIG_1. For example, the biomedical signal processor 1410 may process the first signal SIG_1, thereby removing noise included in the first signal SIG_1 and converting the first signal SIG_1 into the biomedical data D_BIO having a format used by the entropy estimator 1430 or the secret key generator 1450. Detailed descriptions of the biomedical signal processor 1410 will be described below with reference to FIG. 4.

The entropy estimator 1430 may receive the biomedical data D_BIO from the biomedical signal processor 1410 and may estimate entropy of the biomedical data D_BIO to generate a key enable signal KEY_EN that is a signal for determining whether the first secret key KEY_1 is generated. For high security of the secure communication channel 10 between the first and second electronic devices 1000 and 2000 of FIG. 1, the first secret key KEY_1 may have high entropy. Thus, the entropy estimator 1430 may estimate entropy based on the biomedical D_BIO generated from the detected biomedical signal and may compare the estimated entropy with predetermined reference entropy, thereby determining whether the first secret key KEY_1 is generated. According to an example embodiment, the predetermined reference entropy compared with the entropy estimated by the entropy estimator 1430 may be substantially the same for the first and second electronic devices 1000 and 2000 of FIG. 1. Detailed descriptions of the entropy estimator 1430 will be described below with reference to FIG. 5.

The secret key generator 1450 may receive the biomedical data D_BIO from the biomedical signal processor 1470, may receive the key enable signal KEY_EN from the entropy estimator 1430, and may generate a first encoding signal KEY_1 based on the biomedical data D_BIO and the key enable signal KEY_EN. For example, when the secret key generator 1450 receives an activated key enable signal KEY_EN, the secret key generator 1450 may generate the first secret key KEY_1 from the biomedical data D_BIO, whereas, when the secret key generator 1450 receives an inactivated key enable signal KEY_EN, the secret key generator 1450 may not generate the first secret key KEY_1. Detailed descriptions of the secret key generator 1450 will be described below with reference to FIG. 6.

The motion signal processor 1470 may receive second and third signals SIG_2 and SIG_3 and may process the second and third signals SIG_2 and SIG_3 to generate motion data D_MOT. For example, the motion signal processor 1470 may process each of the second and third signals SIG_2 and SIG_3 to remove noise and may delay the second signal SIG_2 or the third signal SIG_3 to synchronize both signals. When the second electronic device 2000 of FIG. 1 transmits the third signal SIG_3 of which noise is removed, to the first electronic device 1000, the motion signal processor 1470 may also omit an operation of removing noise of the third signal SIG_3. Detailed descriptions of the motion signal processor 1470 will be described below with reference to FIGS. 7 and 8.

The comparator 1490 may receive the motion data D_MOT from the motion signal processor 1470 and may generate a function enable signal and may generate a function enable signal FUN_EN for determining whether to perform a predetermined function. For example, the comparator 1490 may compare motions detected by the first and second electronic devices 1000 and 2000 based on the motion data D_MOT to determine whether both motions are identical to each other. When both motions are identical to each other, the comparator 1490 may generate an activated function enable signal FUN_EN, whereas, when both motions are not identical to each other, the comparator 1490 may generate an inactive function enable signal FUN_EN. The function enable signal FUN_EN may be transmitted to an element of the first electronic device 1000 (for example, a central processor (CPU)) for performing a predetermined function, and the controller 1400' may also selectively perform a predetermined function according to the function enable signal FUN_EN.

Figure 4:
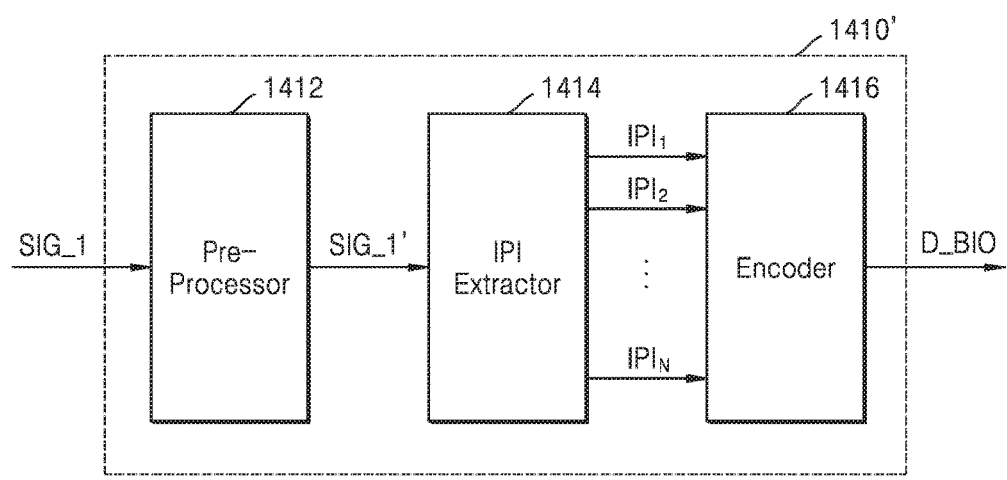
FIG. 4 is a block diagram of a biomedical signal processor according to an example embodiment.

FIG. 4 is a block diagram of a biomedical signal processor 1410' according to an example embodiment. As described above with reference to FIG. 3, the biomedical signal processor 1410' may detect the biomedical signal to receive the generated first signal SIG_1 and may process the first signal SIG_1 to generate biomedical data D_BIO. The biomedical signal processor 1410' of FIG. 4 may process the first signal SIG_1 including an ECC signal and a PPG signal, as illustrated in FIG. 2, to generate the biomedical data D_BIO. Referring to FIG. 4, the biomedical signal processor 1410' may include a preprocessor 1412, an IPI extractor 1414, and an encoder 1416. Each of elements of the biomedical signal processor 1410' may be a hardware block including a logic circuit or a software block including a plurality of commands.

The preprocessor 1412 may process the first signal SIG_1 to generate a preprocessed first signal SIG_1'. For example, the preprocessor 1412 may filter the first signal SIG_1 to remove noise of the first signal SIG_1. The preprocessor 1412 may receive the ECG signal and the PPG signal illustrated in FIG. 2 sequentially or simultaneously.

The IPI extractor 1414 may extract the IPIs, i.e., $IPI_1$, $IPI_2$, ..., and $IPI_N$ from the preprocessed first signal SIG_1'. As illustrated in FIG. 2, the ECG signal and the PPG signal may be periodic signals, and the IPI extractor 1414 may extract a series of IPIs, i.e., $IPI_1$, $IPI_2$, ..., and $IPI_N$ from the ECC signal and the PPG signal. For example, the IPI extractor 1414 may extract the series of IPIs, i.e., $IPI_1$, $IPI_2$, ..., and $IPI_N$ from each of the ECC signal and the PPG signal.

The encoder 1416 may encode the series of IPIs, i.e., $IPI_1$, $IPI_2$, ..., and $IPI_N$ to generate biomedical data D_BIO. For example, the encoder 1416 may binary-encode the series of IPIs, i.e., $IPI_1$, $IPI_2$, ..., and $IPI_N$ to generate the biomedical data D_BIO. That is, the encoder 1416 may map the series of IPIs, i.e., $IPI_1$, $IPI_2$, ..., and $IPI_N$ onto the biomedical data D_BIO using an arbitrary encoding method. According to an example embodiment, the first secret key KEY_1 may be generated based on differences between the adjacent IPIs, i.e., $IPI_1$ and $IPI_2$, and variance (i.e., heart rate variability (HRV)) of the series of IPIs, i.e., $IPI_1$, $IPI_2$, ..., and $IPI_N$ may be finally a source of entropy.

Figure 5:
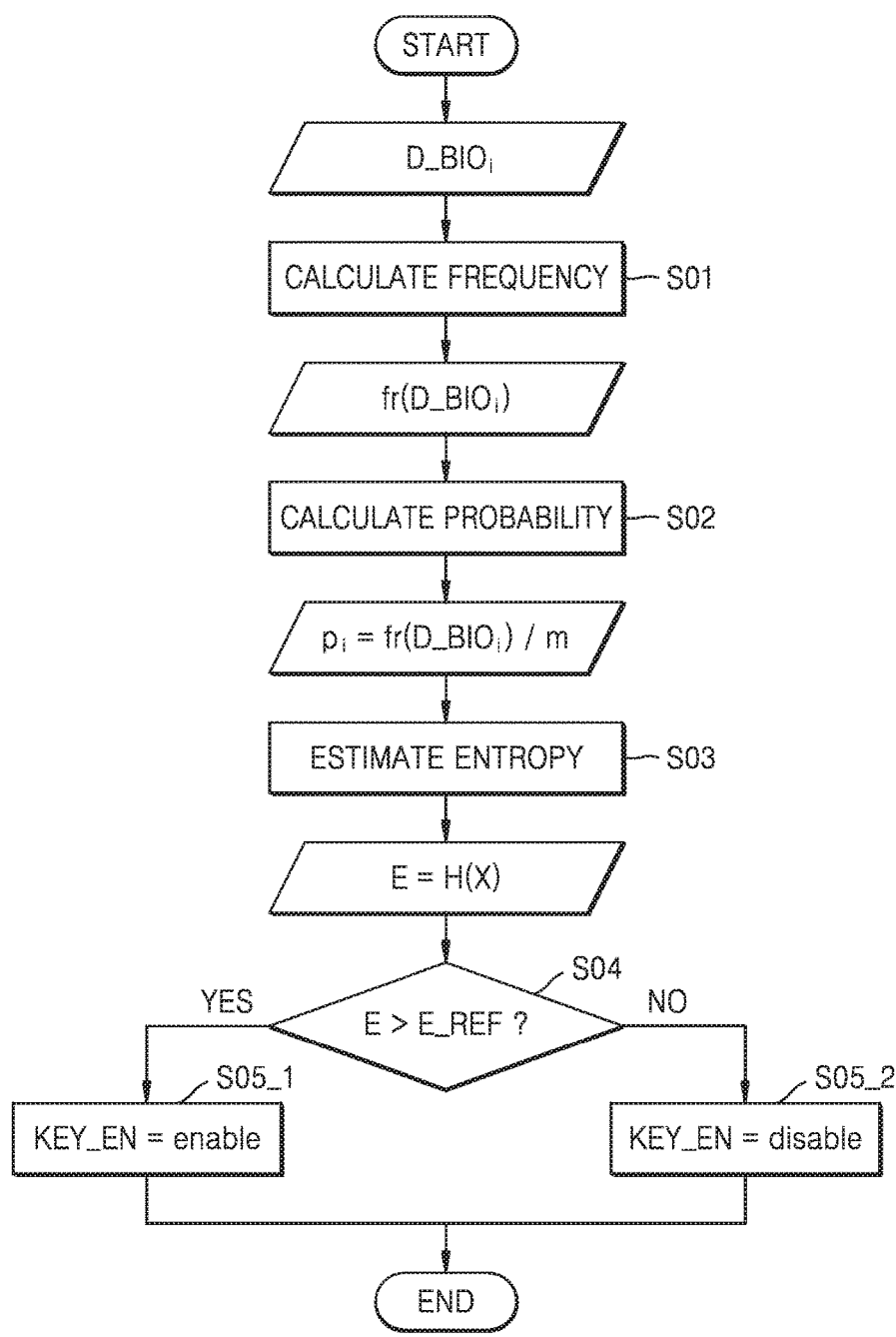
FIG. 5 is a flowchart illustrating an operation of an entropy estimator of FIG. 3, according to an example embodiment.

FIG. 5 is a flowchart illustrating an operation of the entropy estimator 1430 of FIG. 3, according to an example embodiment. As described above with reference to FIG. 3, the entropy estimator 1430 may estimate entropy of the biomedical data D_BIO received from the biomedical signal processor 1410 to generate a key enable signal KEY_EN for determining whether the first secret key KEY_1 is generated. Hereinafter, FIG. 5 will be described with reference to FIG. 3.

Referring to FIG. 5, in operation S01, the entropy estimator 1430 may calculate a frequency $fr(D\_BIO_i)$ of biomedical data $D\_BIO_i$ received from the biomedical signal processor 1410. The biomedical data $D\_BIO_i$ may be data encoded from a set of IPIs, i.e., $IPI_1$, $IPI_2$, ..., and $IPI_N$. For example, the entropy estimator 1430 may calculate a frequency defined as the number of times the biomedical data $D\_BIO_i$ is generated during a time, i.e., a frequency defined as the number of times the series of IPIs, i.e., $IPI_1$, $IPI_2$, ..., and $IPI_N$ corresponding to the biomedical data $D\_BIO_i$ are generated during a time.

In operation S02, the entropy estimator 1430 may calculate a probability $p_i$. The probability $p_i$ is a value for calculating future entropy H and may be calculated using the following Equation 1.

$$p_i = fr(D\_BIO_i)/m \quad (1)$$

In Equation 1 and the following Equations, m is the number of types of encoded data, i.e., the number of elements of a set of the biomedical data D_BIO when the series of IPIs, i.e., $IPI_1$, $IPI_2$, ..., and $IPI_N$ are mapped onto one element of a set of the biomedical data D_BIO by the encoder 1416 of FIG. 4.

In operation S03, the entropy estimator 1430 may estimate entropy E. The entropy E may be estimated using various methods, and in a non-limiting example, as presented in Equations 2 to 3, the entropy E may be calculated by "min-entropy $H_\infty(X)$", "Shannon entropy $H_1(X)$", and "collision entropy $H_2(X)$".

$$H_\infty(X) = -\log_2 \max_{i \in 1,m} \{p_i\} \quad (2)$$

$$H_1(X) = -\sum_{i=1}^{m} p_i \log_2(p_i) \quad (3)$$

$$H_2(X) = -\log_2 \sum_{i=1}^{m} (p_i)^2 \quad (4)$$

In Equations 2 to 4, X is a discrete random variable, and 1, 2, ..., and m are indexes that represent m values of the encoded data, i.e., the biomedical data D_BIO. $p_i$ is a probability of a value corresponding to an index i and may be calculated in the above-described operation S02, for example, like in Equation 1.

In operation S04, the entropy estimator 1430 may compare estimated entropy E with predetermined reference entropy E_REF. When the estimated entropy E is greater than the reference entropy E_REF, in operation S05_1, the entropy estimator 1430 may output an activated key enable signal KEY_EN to generate a first secret key KEY_1. On the other hand, when the estimated entropy E is less than the reference entropy E_REF, in operation S05_2, the entropy estimator 1430 may generate an inactivated key enable signal KEY_EN not to generate the first secret key KEY_1. When the reference entropy E_REF is not satisfied only with the detected biomedical signal, additional input is used so that entropy E may be increased, as described below with reference to FIGS. 14A and 14B.

Figure 6:
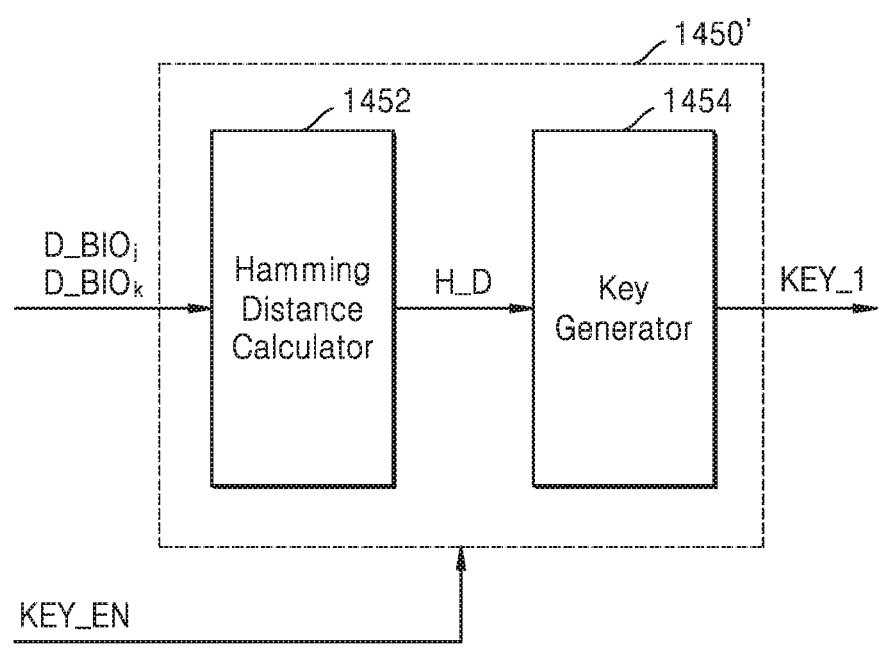
FIG. 6 is a block diagram of a secret key generator according to an example embodiment.

FIG. 6 is a block diagram of a secret key generator 1450' according to an example embodiment. As described above with reference to FIG. 3, the secret key generator 1450' may receive biomedical data D_BIO$_j$ and D_BIO$_k$ and a key enable signal KEY_EN. When the secret key generator 1450' receives an activated key enable signal KEY_EN, the secret key generator 1450' may generate a first secret key KEY_1. Referring to FIG. 6, the secret key generator 1450' may include a Hamming distance calculator 1452 and a key generator 1454. Each of elements of the secret key generator 1450' may be a hardware block including a logic circuit or a software block including a plurality of commands.

The Hamming distance calculator 1452 may calculate a Hamming distance H_D between the biomedical data D_BIO$_3$ and D_BIO$_k$. According to an example embodiment, the biomedical data D_BIO$_j$ and the biomedical data D_BIO$_k$ may be generated from biomedical signals detected by each of different biomedical signal sensors. For example, referring to FIG. 2, the biomedical data D_BIO$_j$ may be data generated by encoding a series of IPIs extracted from the ECG signal generated by the ECG sensor 1120, and the biomedical data D_BIO$_k$ may be data generated by encoding a series of IPIs extracted from the PPG signal generated by the PPG sensor 1140. The Hamming distance calculator 1452 may calculate the Hamming distance H_D between both biomedical data D_BIO$_j$ and D_BIO$_k$ and may provide the calculated Hamming distance H_D to the key generator 1454.

The key generator 1454 may receive the Hamming distance H_D from the hamming distance calculator 1452 and may generate a first secret key KEY_1 based on the received Hamming distance H_D. For example, the key generator 1454 may generate the first secret key KEY_1 in consideration of an encoding method of the communication interface 1300 of FIG. 1. In addition, differently from FIG. 6, according to an example embodiment, the key generator 1454 may receive the biomedical data D_BIO$_j$ and D_BIO$_k$ and may generate the first secret key KEY_1 from the biomedical data D_BIO$_j$ and D_BIO$_k$.

Figure 7:
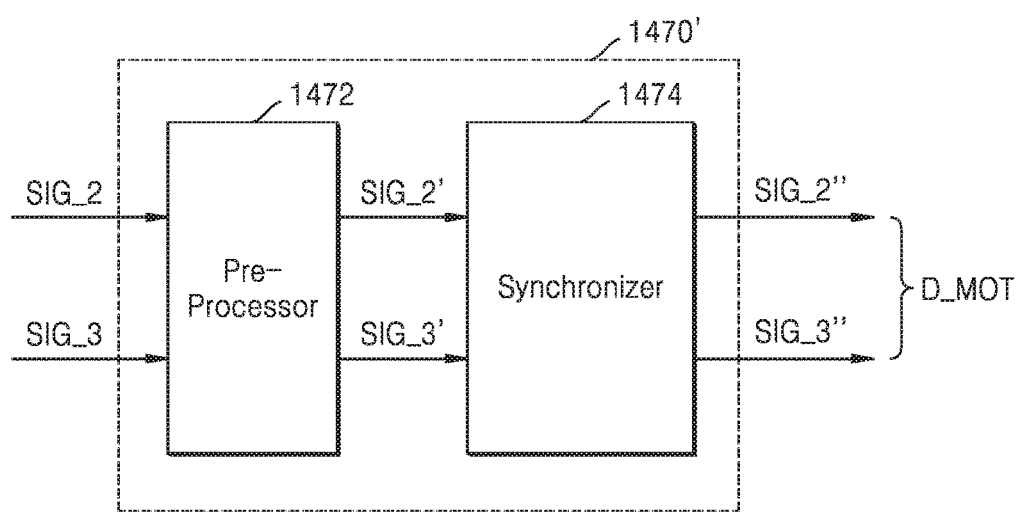
FIG. 7 is a block diagram of a motion signal processor according to an example embodiment.

FIG. 7 is a block diagram of a motion signal processor 1470' according to an example embodiment. As described above with reference to FIG. 3, the motion signal processor 1470' may receive second and third signals SIG_2 and SIG_3 and may process the second and third signals SIG_2 and SIG_3 to generate motion data D_MOT. As illustrated in FIG. 7, the motion signal processor 1470' may include a preprocessor 1472 and a synchronizer 1474. Each of elements of the motion signal processor 1470' may be a hardware block including a logic circuit or a software block including a plurality of commands.

The preprocessor 1472 may process the second and third signals SIG_2 and SIG_3 to generate the preprocessed second and third signals SIG_2' and SIG_3'. For example, the preprocessor 1472 may filter the second and third signals SIG_2 and SIG_3, thereby removing noise thereof. When the second electronic device 2000 of FIG. 1 transmits the third signal SIG_3 of which noise is removed, to the first electronic device 1000, the preprocessor 1472 may also omit an operation of removing noise of the third signal SIG_3.

The synchronizer 1474 may synchronize the preprocessed second and third signals SIG_2' and SIG_3'. Because the second signal SIG_2 is a signal generated in the first electronic device 1000 and the third signal SIG_3 is a signal generated in the second device 2000, for comparison of the second and third signals SIG_2 and SIG_3, the second and third signals SIG_2 and SIG_3 are synchronized with each other. The synchronizer 1474 may synchronize the preprocessed second and third signals SIG_2' and SIG_3' to generate synchronized second and third signals SIG_2" and SIG_3", and the synchronized second and third signals SIG_2" and SIG_3" may constitute the motion data D_MOT. Hereinafter, detailed descriptions of the synchronizer 1474 will be described below with reference to FIG. 8.

Figure 8:
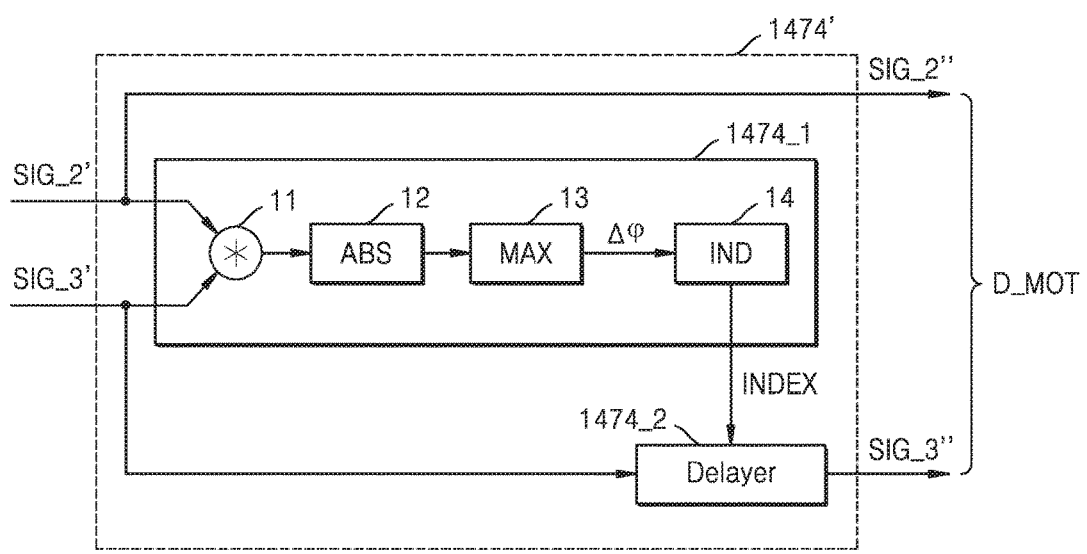
FIG. 8 is a block diagram of a synchronizer according to an example embodiment.

FIG. 8 is a block diagram of a synchronizer 1474' according to an example embodiment. The synchronizer 1474' may delay one of the preprocessed second and third signals SIG_2' and SIG_3' to synchronize the preprocessed second and third signals SIG_2' and SIG_3'. In the example of FIG. 8, the synchronizer 1474' may delay the preprocessed third signal SIG_3'. However, the technical spirit of the inventive concept is not limited thereto. That is, the preprocessed second signal SIG_2' may be delayed by the synchronizer 1474 of FIG. 7, and both the preprocessed second and third signals SIG_2' and SIG_3' may also be delayed by the synchronizer 1474 of FIG. 7. Referring to FIG. 8, the synchronizer 1474' may include an arithmetic operator 1474_1 and a delayer 1474_2.

The arithmetic operator 1474_1 may calculate a phase difference Δφ of both signals SIG_2' and SIG_3', as shown in the following Equation 5, so that the preprocessed second and third signals SIG_2' and SIG_3' may be synchronized with each other in a time-domain.

$$\Delta \varphi = \underset{i \in 1,n}{\mathrm{argmax}} |\langle SIG\_2' \rangle * \langle SIG\_3' \rangle| \quad (5)$$

In Equation 5, n is the number of independent signals included in each of the preprocessed second and third signals SIG_2' and SIG_3' so that motions may be represented. For example, when a three-axis accelerator and a three-axis gyroscope are used to detect motions, the number of independently-acquired signals is 6, and thus, n=6. In addition, in Equation 5, "<SIG_2'>*<SIG_3'>" are cross-correlation between both signals SIG_2' and SIG_3'. As illustrated in FIG. 8, the arithmetic operator 1474_1 may include a cross-correlation calculator 11, an absolute value calculator 12, and a maximum value calculator 13 to calculate the phase difference Δφ between both signals SIG_2' and SIG_3', as shown in Equation 5.

An index generator 14 of the arithmetic operator 1474_1 may generate an index INDEX corresponding to the calculated phase difference Δφ. For example, the index generator 14 may generate an index INDEX from the phase difference Δφ based on a sample rate of the preprocessed second and third signals SIG_2' and SIG_3'. Each of elements of the arithmetic operator 1474_1 may be a software block including a logic circuit or a software block including a plurality of commands.

The delayer 1474_2 may generate a synchronized third signal SIG_3" by delaying the preprocessed third signal SIG_3' based on the index INDEX. Thus, the synchronized second and third signals SIG_2" and SIG_3" may be generated as the motion data D_MOT.

Figure 9:
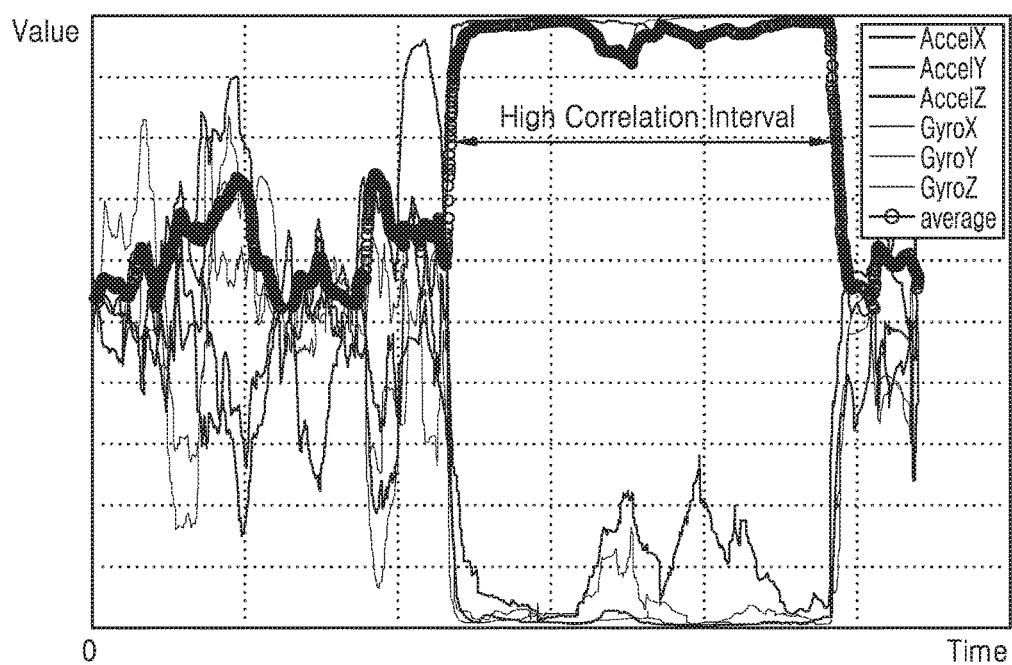
FIG. 9 is a graph of a second or third signal of FIG. 1 that is generated by detecting a motion, according to an example embodiment.

FIG. 9 is a graph of the second or third signal SIG_2 or SIG_3 of FIG. 1 that is generated by detecting a motion, according to an example embodiment. The motion may be detected by a three-axis accelerator and a three-axis gyroscope, and the graph of FIG. 9 shows six signals (thin lines) of which values are changed according to the detected motion, and values (thick lines) calculated by the following Equation 6.

According to an example embodiment, the comparator 1490 of FIG. 3 may determine whether motions detected by the first and second electronic devices 1000 and 2000 are identical to each other in the time-domain. For example, the comparator 1490 may compare both signals SIG_2" and SIG_3" by estimating correlation between the synchronized second and third signals SIG_2" and SIG_3" in the time-domain. The comparator 1490 may calculate a pair-wise correlation coefficient ($\rho_{x,y}$) with respect to signals included in a window W having a predetermined size by using a sliding window technique to compare the synchronized second and third signals SIG_2" and SIG_3". The comparator 1490 may calculate six pair-wise correlation coefficients ($\rho_{x,y}$) from six-pair signals in correspondence from the synchronized second and third signals SIG_2" and SIG_3" and may average them, thereby calculating a value that represents correlation between the synchronized second and third signals SIG_2" and SIG_3" in the time-domain, as shown in the following Equation 6.

$$\overline{R(\langle SIG\_2''\rangle, \langle SIG\_3''\rangle)} = \frac{1}{n}\sum_{i=1}^{n} |\rho_{x,y}| \quad (6)$$

As shown in FIG. 9, a section in which a value calculated by Equation 6 is uniformly high, may be observed. That is, a section or interval in which a plurality of motion signals have high correlation, may be observed. In such a section, the first and second electronic devices 1000 and 2000 may determine that motions are synchronized (for example, the case in which the user picks up both the first and second electronic devices with his/her hand or wears them). Thus, the comparator 1490 may compare the value calculated by Equation 6 with a predetermined reference value, thereby determining whether the motions detected by the first and second electronic devices 1000 and 2000 are identical to each other. For example, when the value calculated by Equation 6 is greater than the predetermined reference value, the comparator 1490 may output an activated function enable signal FUN_EN.

Figure 10:
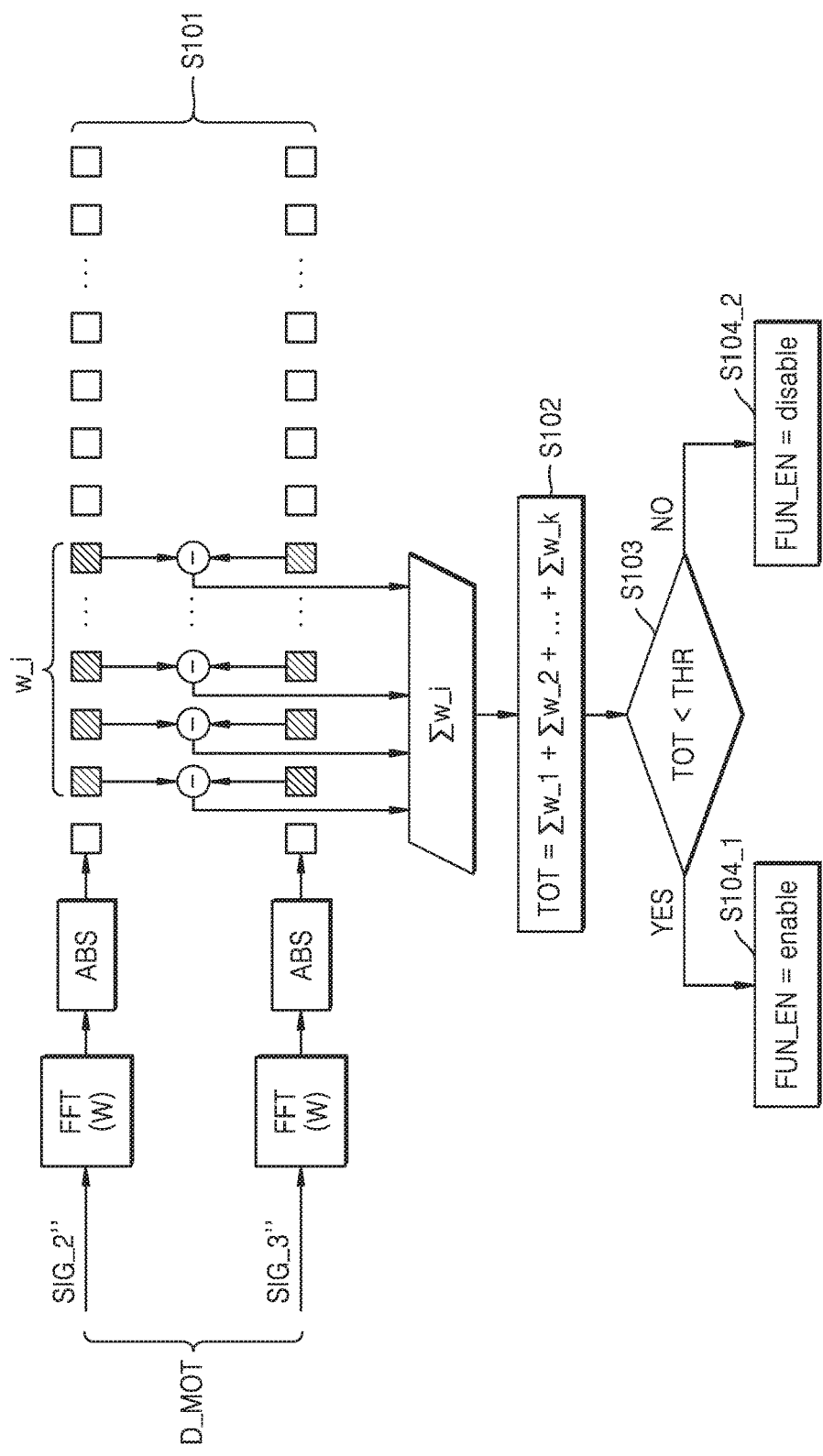
FIGS. 10 and 11 are schematic diagrams illustrating operations of a comparator of FIG. 3, according to example embodiments.
Figure 11:
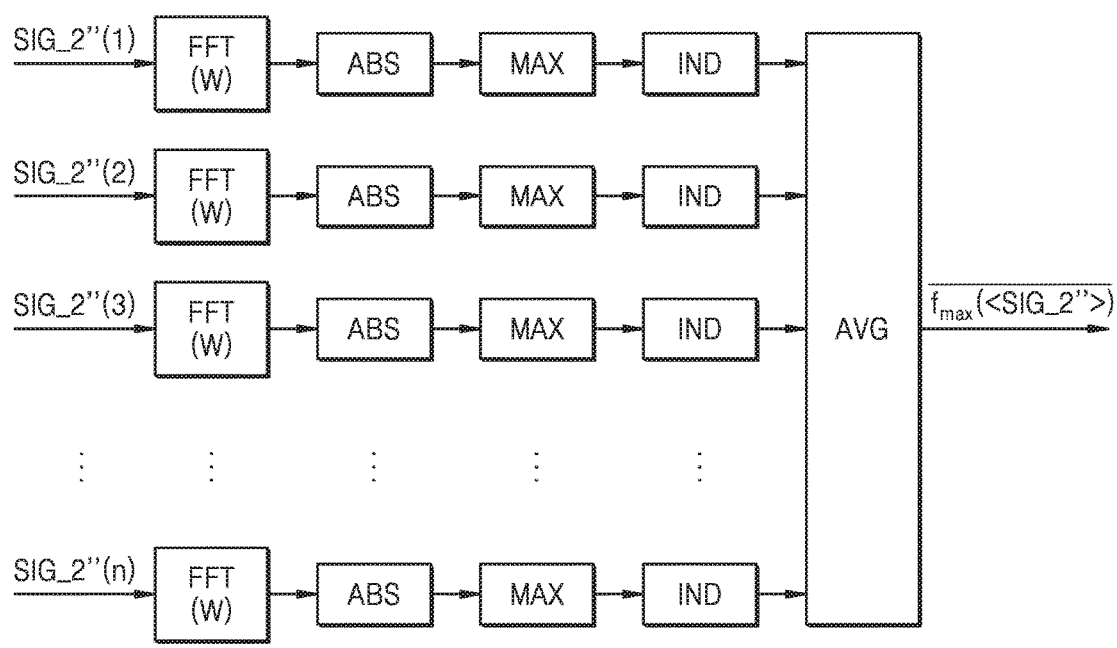

FIGS. 10 and 11 are schematic diagrams illustrating operations of the comparator 1490 of FIG. 3, according to example embodiments. In detail, FIGS. 10 and 11 schematically illustrate operations in which the synchronized second and third signals SIG_2" and SIG_3" are compared with each other by the comparator 1490 in a frequency-domain. In detail, FIG. 10 illustrates an operation in which the comparator 1490 determines whether motions corresponding to the synchronized second and third signals SIG_2" and SIG_3" are substantially identical to each other based on a difference between frequency spectrums of the synchronized second and third signals SIG_2" and SIG_3", according to an example embodiment. Also, FIG. 11 illustrates an operation in which the comparator 1490 detects maximum frequency components from the frequency spectrums of signals included in the window W between the synchronized second and third signals SIG_2" and SIG_3", compares the maximum frequency components, thereby determining whether the motions corresponding to the synchronized second and third signals SIG_2" and SIG_3" are substantially identical to each other, according to an example embodiment. FIG. 11 illustrates an operation of detecting a maximum frequency component from the synchronized second signal SIG_2", and an operation of detecting a maximum frequency component from the synchronized third signal SIG_3" may be the same as that of FIG. 11.

Referring to FIG. 10, in operation S101, the comparator 1490 may sequentially perform a fast Fourier transform (FFT) operation and an absolute value operation on the synchronized second and third signals SIG_2" and SIG_3", thereby generating a series of frequency components that represent frequency spectrums of the synchronized second and third signals SIG_2" and SIG_3". Also, the comparator 1490 may calculate a difference between frequency components included in a window w_i and may calculate the sum $\Sigma$w_i of the differences.

In operation S102, the comparator 1490 may acquire a total TOT by adding sums $\Sigma$w_1, $\Sigma$w_2, . . . , and $\Sigma$w_k calculated in each window by moving the window W. In operation S103, the comparator 1490 may compare the total TOT with a predetermined threshold value THR. When the total TOT is less than the threshold value THR, the comparator 1490 may output an activated function enable signal FUN_EN in operation S104_1. On the other hand, when the total TOT is substantially equal to or greater than the threshold value, the comparator 1490 may output an inactivated function enable signal FUN_EN in operation S104_2.

Referring to FIG. 11, the comparator 1490 may detect maximum frequency components of independent signals (for example, six independent signals) included in the synchronized second signal SIG_2" and may average the detected frequency components, thereby detecting a maximum frequency component of the synchronized second signal SIG_2". That is, the comparator 1490 may detect the maximum frequency component of the synchronized second signal SIG_2", as shown in the following Equation 7.

$$\overline{f_{max}(\langle SIG\_2''\rangle)} = \frac{1}{n}\sum_{i=1}^{n} \underset{i \in 1,k}{\mathrm{argmax}}\{f_i(\langle SIG\_2''\rangle)\} \quad (7)$$

Similarly, the comparator 1490 may detect a maximum frequency component of the synchronized third signal SIG_3", as shown in the following Equation 8.

$$\overline{f_{max}(\langle SIG\_3''\rangle)} = \frac{1}{n}\sum_{i=1}^{n} \underset{i \in 1,k}{\mathrm{argmax}}\{f_i(\langle SIG\_3''\rangle)\} \quad (8)$$

The comparator 1490 may compare the maximum frequency components calculated by Equations 7 and 8. Thus, when a difference therebetween is less than a predetermined threshold value, the comparator 1490 may generate an activated function enable signal FUN_EN, and when the difference is equal to or greater than the predetermined threshold value, the comparator 1490 may generate an inactivated function enable signal FUN_EN.

Figure 12:
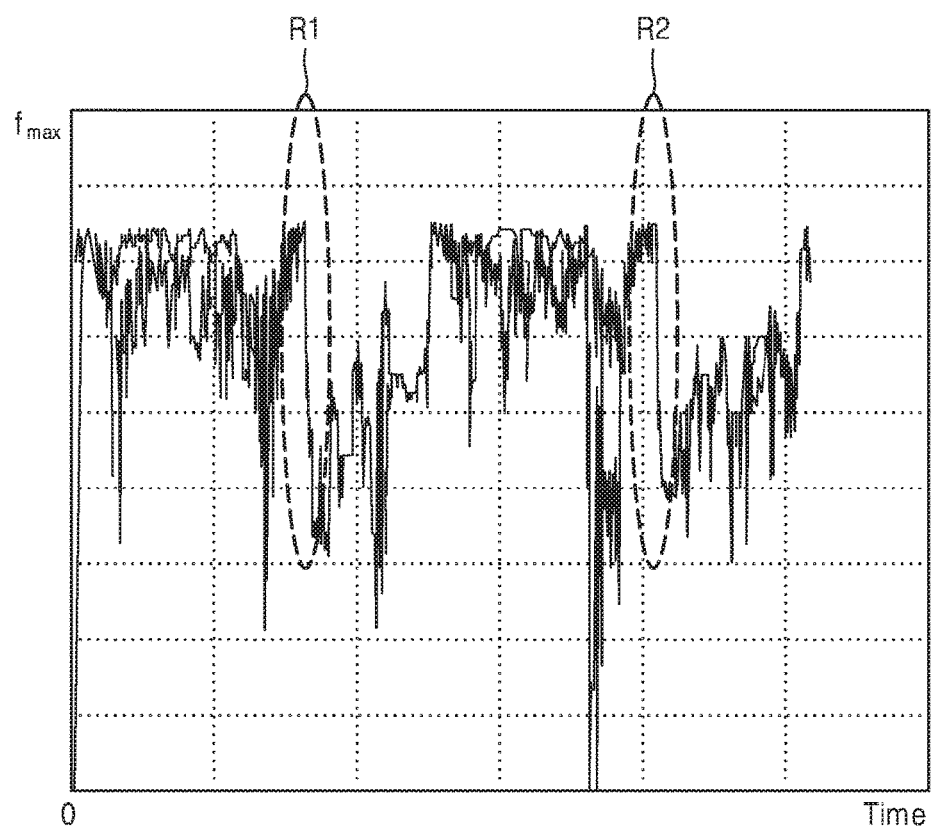
FIG. 12 is a graph showing a change in maximum frequency components of the second and third signals of FIG. 1 versus time, according to an example embodiment.

FIG. 12 is a graph showing a change in maximum frequency components of the second and third signals SIG_2 and SIG_3 of FIG. 1 versus time, according to an example embodiment. In detail, the graph of FIG. 12 shows a change in values calculated by Equations 7 and 8 versus the flow of time. As illustrated in FIG. 12, sections R1 and R2 in which the maximum frequency components of the second and third signals SIG_2 and SIG_3 are equally changed, may be generated. The comparator 1490 may detect the sections R1 and R2 such that motions of the first and second electronic devices 1000 and 2000 may be synchronized with each other, or it may be determined that the same motions occur in the first and second electronic devices 1000 and 2000. According to an example embodiment, as illustrated in FIGS. 10 and 11, when the comparator 1490 processes signals in the frequency-domain, synchronization by the synchronizer 1474 of FIG. 7 may be omitted. Thus, the comparator 1490 may compare the preprocessed second and third signals SIG_2' and SIG_3' with each other in the frequency-domain.

Figure 13A:
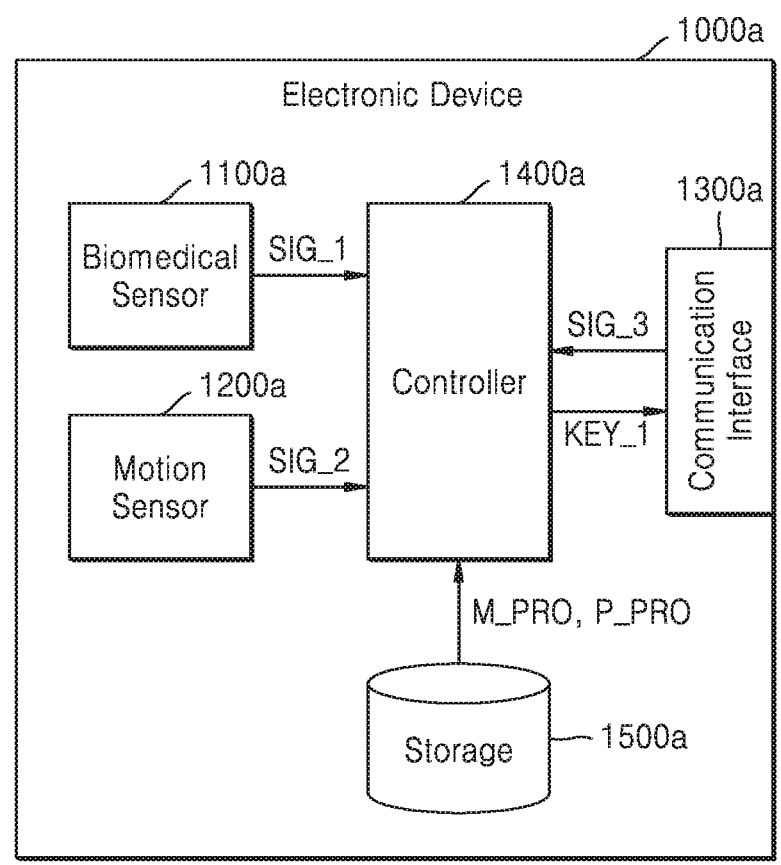
FIG. 13A is a block diagram of an electronic device according to an example embodiment.
Figure 13B:
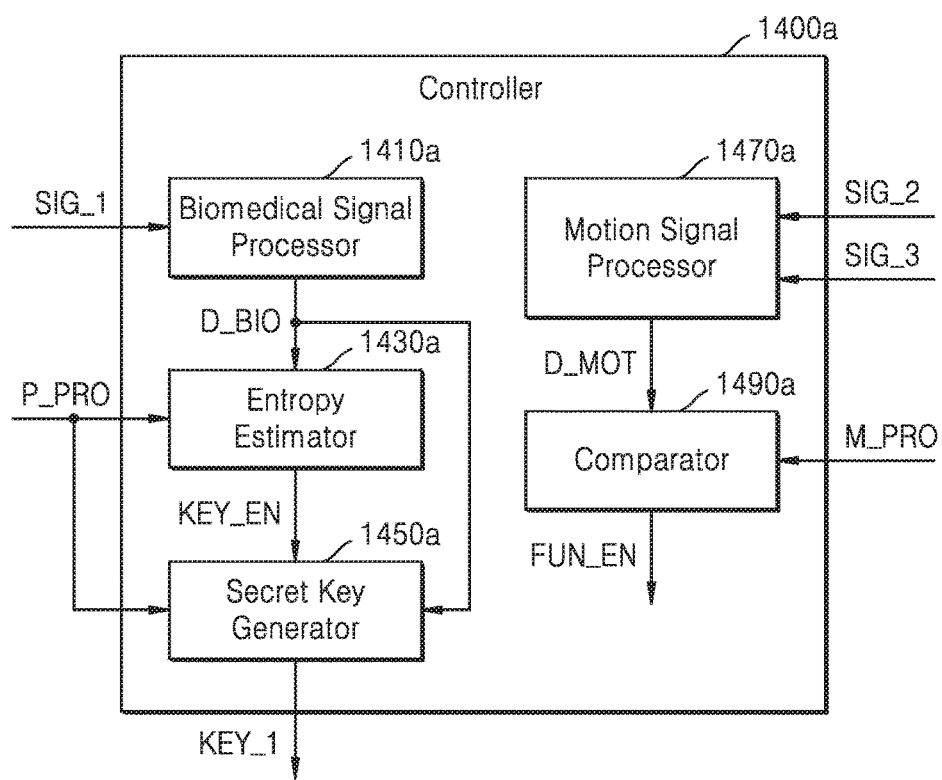
FIG. 13B is a block diagram of a controller included in the electronic device of FIG. 13A.

FIG. 13A is a block diagram of an electronic device 1000a according to an example embodiment, and FIG. 13B is a block diagram of a controller 1400a included in the electronic device 1000a of FIG. 13A. In the following descriptions of FIGS. 13A and 13B, redundant descriptions with the descriptions of FIGS. 1 and 3 will be omitted.

Referring to FIG. 13A, the electronic device 1000a may include a biomedical sensor 1100a, a motion sensor 1200a, a communication interface 1300a, a controller 1400a, and a storage 1500a. Compared with the first electronic device 1000 of FIG. 1, the electronic device 1000a of FIG. 13A may further include the storage 1500a.

The storage 1500a may store at least one motion profile M_PRO and may provide the stored motion profile M_PRO to the controller 1400a. The motion profile M_PRO may be data generated from a motion. Also, the storage 1500a may store at least one personal profile P_PRO and may provide the stored personal profile P_PRO to the controller 1400a. The personal profile P_PRO may include inherent information of a true user (for example, an owner) of the electronic device 1000a. For example, the personal profile P_PRO may include a pin PIN preset by the true user. Although, in FIG. 13A, the storage 1500a provides both the motion profile M_PRO and the personal profile P_PRO. However, according to an example embodiment, the storage 1500a may store only one of the motion profile M_PRO and the personal profile P_PRO.

Referring to FIG. 13B, the controller 1400a may include a biomedical signal processor 1410a, an entropy estimator 1430a, a secret key generator 1450a, a motion signal processor 1470a, and a comparator 1490a. Compared with the controller 1400 of FIG. 3, the entropy estimator 1430a and the secret key generator 1450a of FIG. 13B may receive the personal profile P_PRO, and the comparator 1490a may receive the motion profile M_PRO.

The entropy estimator 1430a may estimate entropy further based on the pin PIN included in the personal profile P_PRO, and the secret key generator 1450a may generate a first secret key KEY_1 further based on the pin PIN included in the personal profile P_PRO. Thus, the first secret key KEY_1 having high entropy may be generated. Also, the comparator 1490a may compare a motion corresponding to the second signal SIG_2 or the third signal SIG_3 with the motion profile M_PRO, thereby determining whether to perform a predetermined function.

Figure 14A:
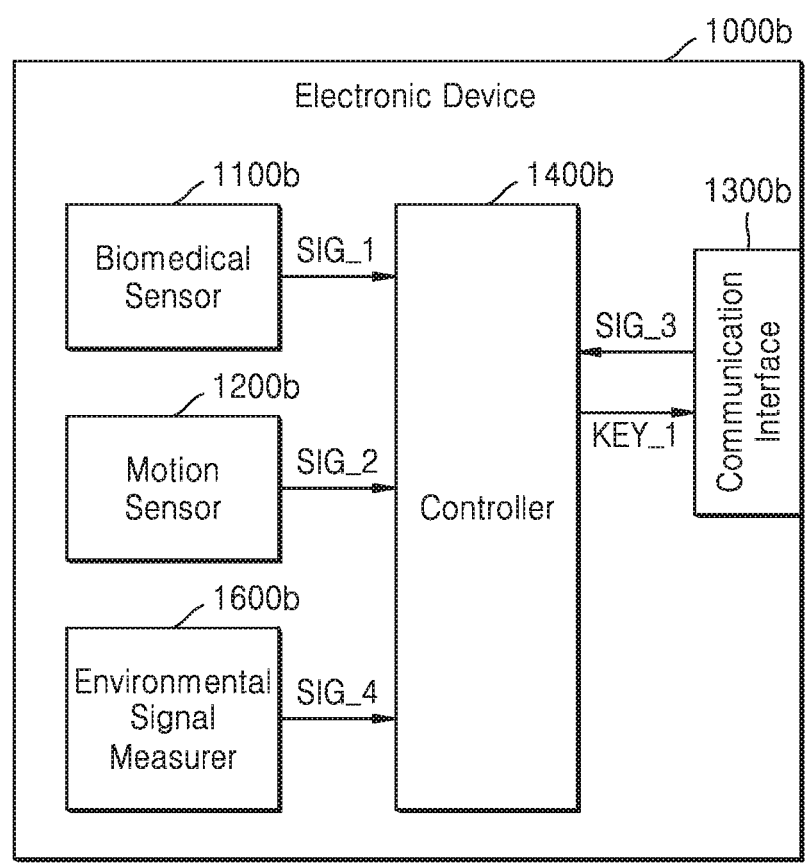
FIG. 14A is a block diagram of an electronic device according to an example embodiment.
Figure 14B:
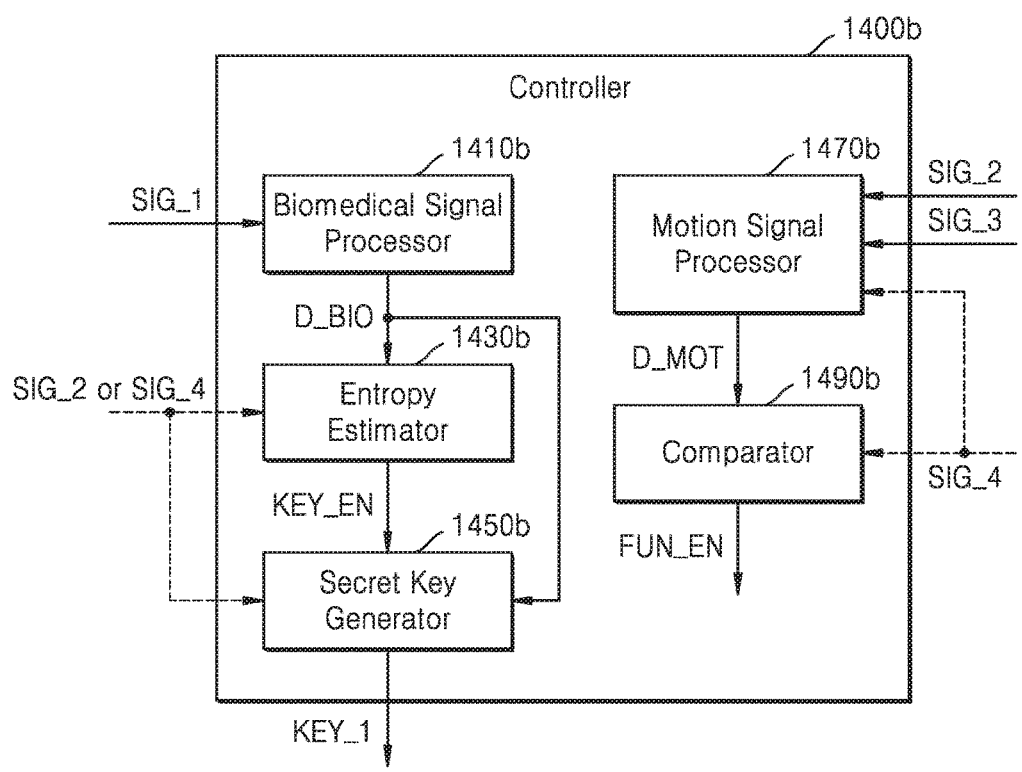
FIG. 14B is a block diagram of a controller included in the electronic device of FIG. 14A.

FIG. 14A is a block diagram of an electronic device 1000b according to an example embodiment, and FIG. 14B is a block diagram of a controller 1400b included in the electronic device 1000b of FIG. 14A. In the following descriptions of FIGS. 14A and 14B, redundant descriptions with the descriptions of FIGS. 1 and 3 will be omitted.

Referring to FIG. 14A, the electronic device 1000b may include a biomedical sensor 1100b, a motion sensor 1200b, a communication interface 1300b, a controller 1400b, and an environmental signal measurer 1600b. Compared with the first electronic device 1000 of FIG. 1, the electronic device 1000b of FIG. 14A may further include the environmental signal measurer 1600b. The environmental signal measurer 1600b may measure environmental signals around the electronic device 1000b, thereby generating a fourth signal SIG_4 and providing the fourth signal SIG_4 to the controller 1400b. The environmental signals may be signals generated outside the electronic device 1000b and may include a global positioning system (GPS) signal, an RF signal, illumination, ambient light, temperature, etc., which are non-limiting examples.

Referring to FIG. 14B, the controller 1400b may include a biomedical signal processor 1410b, an entropy estimator 1430b, a secret key generator 1450b, a motion signal processor 1470b, and a comparator 1490b. Compared with the controller 1400 of FIG. 3, the entropy estimator 1430b and the secret key generator 1450b of FIG. 14B may receive the second signal SIG_2 or the fourth signal SIG_4, and the motion signal processor 1470b and the comparator 1490b may receive the fourth signal SIG_4. The second signal SIG_2 or the fourth signal SIG_4 received by the entropy estimator 1430b and the secret key generator 1450b may be a preprocessed signal, and the fourth signal SIG_4 received by the comparator 1490b may also be a preprocessed signal.

The entropy estimator 1430b may estimate entropy further based on the second signal SIG_2 or the fourth signal SIG_4, and the secret key generator 1450b may generate a first secret key KEY_1 further based on the second signal SIG_2 or the fourth signal SIG_4. Thus, the first secret key KEY_1 having high entropy may be generated. For example, when the fourth signal SIG_4 is generated by measuring a plurality of RF signals transmitted from an access point (AP), the secret key generator 1450b may determine a triangular location of the electronic device 1000b of FIG. 14A based on the fourth signal SIG_4 and may generate the first secret key KEY_1 further based on the determined triangular location.

When the fourth signal SIG_4 is generated by measuring the GPS signal, the motion signal processor 1470b may synchronize the second and third signals SIG_2 and SIG_3 based on the fourth signal SIG_4. Also, the comparator 1490b may determine whether to perform a predetermined function further based on whether the fourth signal SIG_4 satisfies predetermined conditions. For example, the comparator 1490b may determine a triangular location of the electronic device 1000b of FIG. 14b based on the fourth signal SIG_4 and may determine whether to perform the predetermined function further based on the determined triangular location.

Figure 15:
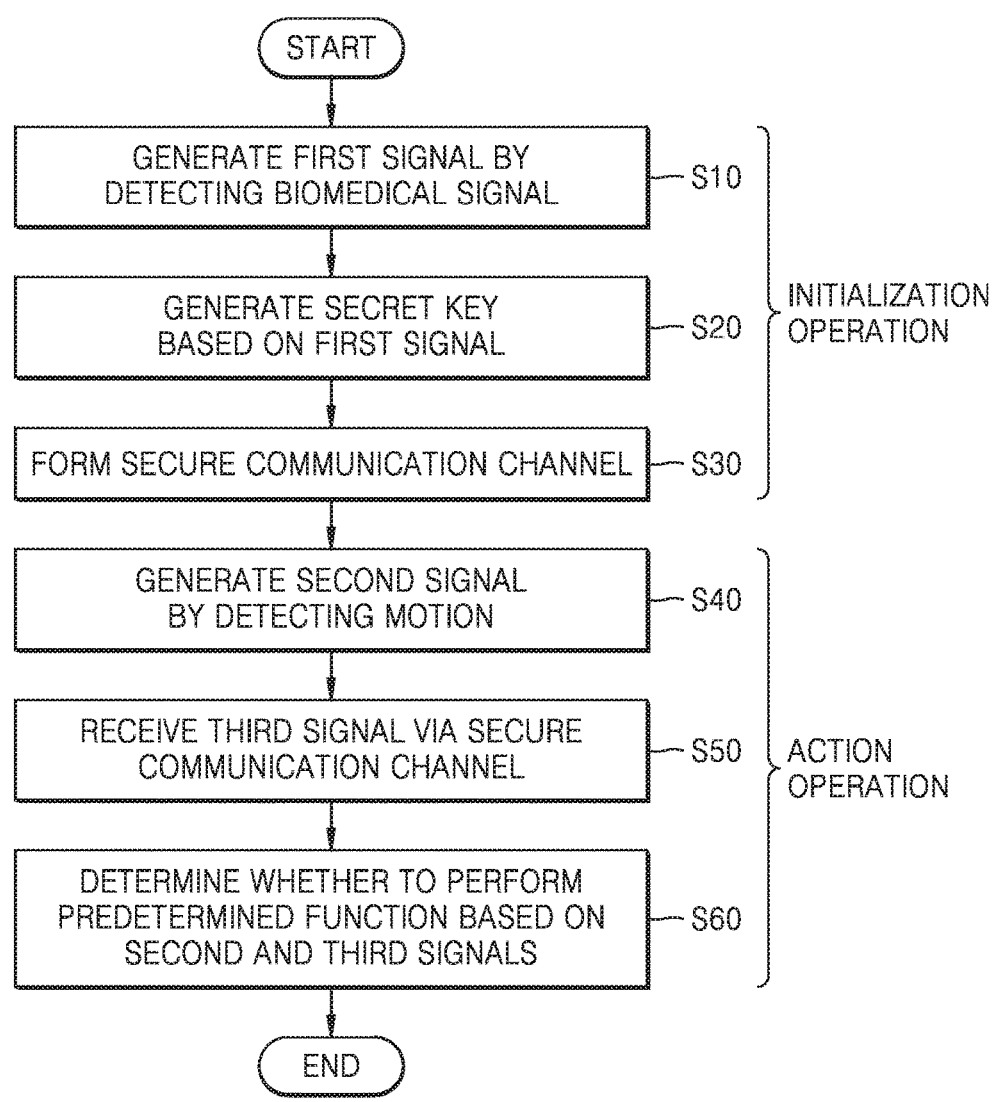
FIG. 15 is a flowchart illustrating a method for secure synchronization and pairing of devices, according to an example embodiment.

FIG. 15 is a flowchart illustrating a method for secure synchronization and pairing between devices, according to an example embodiment. Operations of the flowchart of FIG. 15 may be performed by an electronic device (for example, the first electronic device 1000 of FIG. 1) according to example embodiments. In FIG. 15, operations S10 to S30 may be included in an operation (or initialization operation) of forming a secure communication channel between devices, and operations S40 to S60 may be included in an operation (action operation) of determining whether to perform a predetermined function.

In operation S10, an operation of generating a first signal by detecting a biomedical signal may be performed. For example, an ECG or PPG signal may be detected as the biomedical signal such that the first signal may be generated. In operation S20, an operation of generating a secret key based on the first signal may be performed. For example, when the first signal includes the ECG signal and the PPG signal, a series of IPIs may be extracted, and a secret key (for example, a first secret key KEY_1 of FIG. 1) may be generated based on the series of extracted IPIs.

In operation S30, an operation of forming a secure communication channel may be performed. The secure communication channel is used to communicate with another electronic device and may be formed using the secret key generated in operation S20. Because another electronic device that communicates with another electronic device via the secure communication channel has also generated a secret key based on a biomedical signal, the secret key of the secure communication channel may be the same for both electronic devices.

In operation S40, an operation of generating a second signal by detecting a motion may be performed. For example, a motion applied to the electronic device may be detected using an accelerator and a gyroscope. Thus, the second signal may be generated.

In operation S50, an operation of receiving a third signal via the secure communication channel may be performed. For example, the third signal may be a signal generated based on a motion detected by another electronic device. In operation S60, an operation of determining whether to perform a predetermined function based on the second and third signals. For example, the second and third signals may be compared with each other in a time-domain or frequency-domain, and whether to perform the predetermined function may be determined depending on whether the second and third signals are substantially identical to each other.

Figure 16:
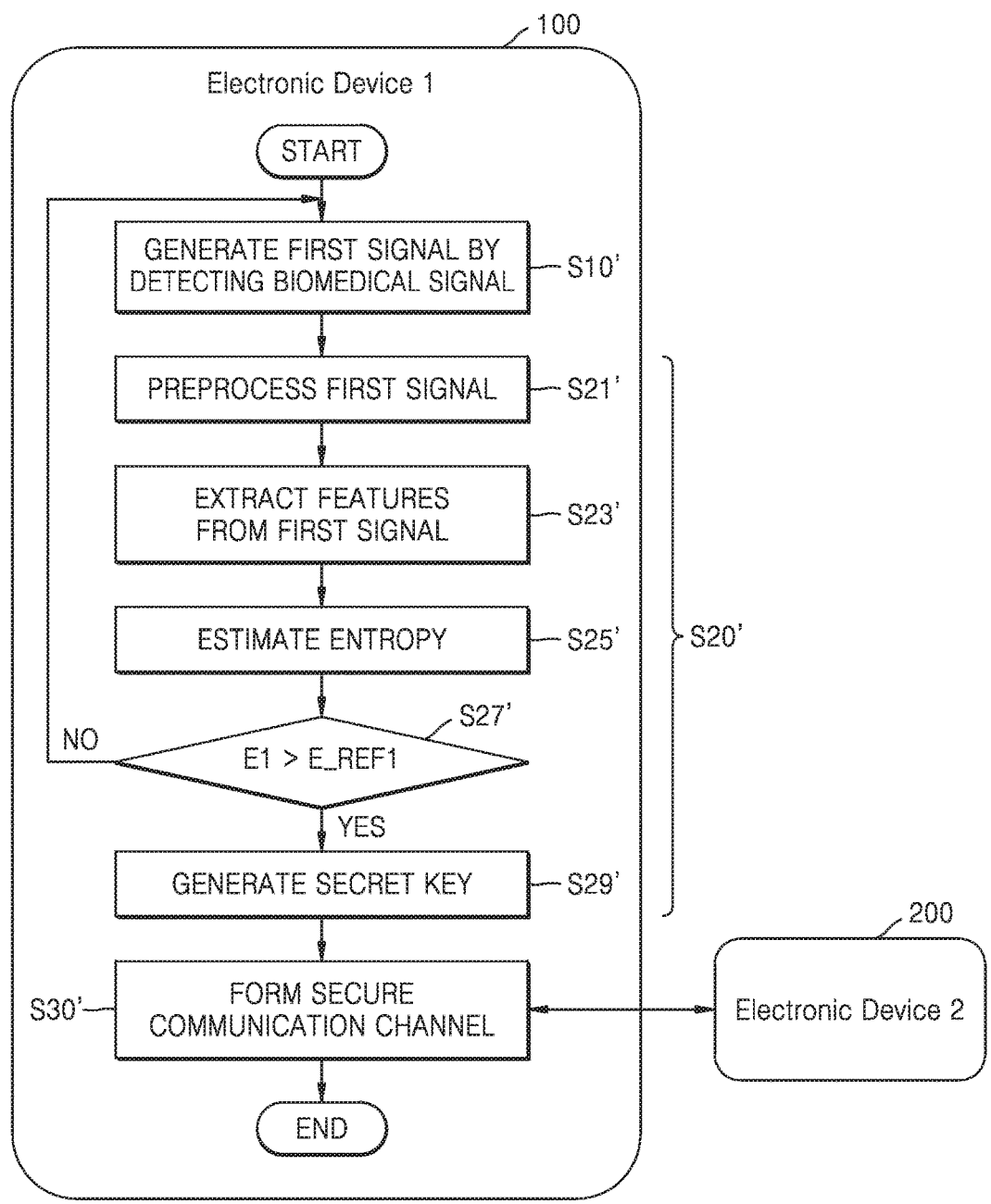
FIG. 16 is a flowchart illustrating a method for forming a secure communication channel, using first and second electronic devices, according to an example embodiment.

FIG. 16 is a flowchart illustrating a method of forming a secure communication channel, using the first and second electronic devices 100 and 200, according to an example embodiment. The first and second electronic devices 100 and 200 may form the secure communication channel according to a user's instruction or periodically. Also, the first and second electronic devices 100 and 200 may discard an existing secret key when a predetermined amount of time is exceeded.

Referring to FIG. 16, in operation S10', the first electronic device 100 may generate a first signal by detecting a biomedical signal.

In operation S20', the first electronic device 100 may generate a secret key. In detail, in operation S21', the first electronic device 100 may preprocess the first signal. For example, the first electronic device 100 may remove noise from the first signal. In operation S23', the first electronic device 100 may extract features from the first signal. For example, the first electronic device 100 may extract a plurality of IPIs from the first signal including signals generated from one or more biomedical signals related to a heartbeat. In operation S25', the first electronic device 100 may estimate entropy. For example, the first electronic device 100 may encode the plurality of extracted IPIs and may estimate entropy of the encoded value. In operation S27', the first electronic device 100 may compare estimated entropy E1 with reference entropy E_REF1. When the estimated entropy E1 is substantially equal to or less than the reference entropy E_REF1, the first electronic device 100 may enter operation S10' of generating the first signal by detecting the biomedical signal. On the other hand, when the estimated entropy E1 is greater than the reference entropy E_REF1, in operation S29', the first electronic device 100 may generate a secret key based on the first signal.

In operation S30', the first electronic device 100 may form a secure communication channel with the second electronic device 200 by using the generated secret key.

The second electronic device 200 may also generate a secret key in substantially the same or similar way to the first electronic device 100 and may form a secure communication channel with the first electronic device 100 based on the generated secret key. Thus, a secure communication channel having high security without being necessary to transmit a secret key between the first and second electronic devices 100 and 200 and perform a complicated work by the user in advance may be easily formed.

Figure 17:
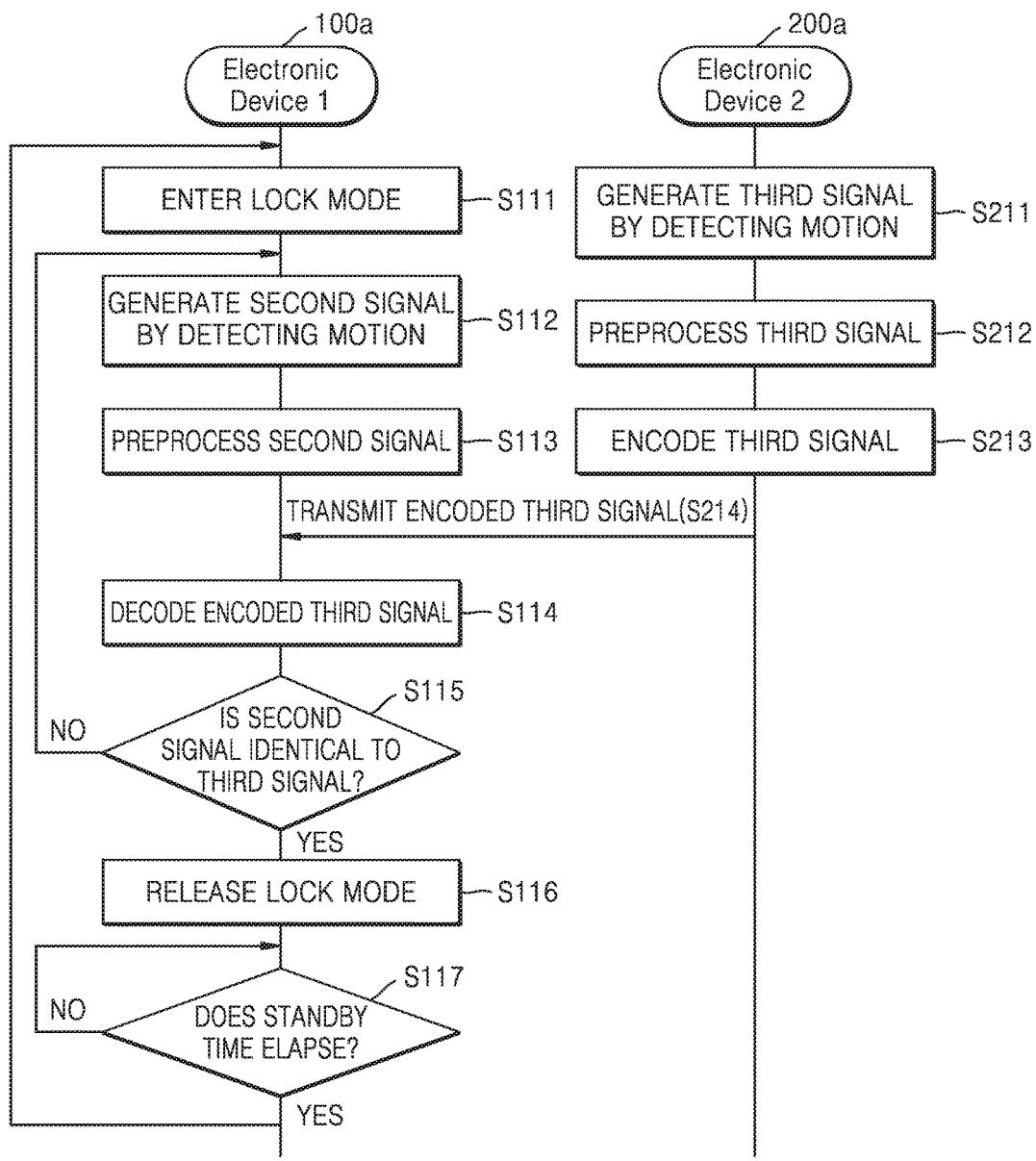
FIGS. 17, 18, and 19 are flowcharts illustrating operations performed by first and second electronic devices that perform predetermined functions selectively, according to example embodiments.
Figure 18:
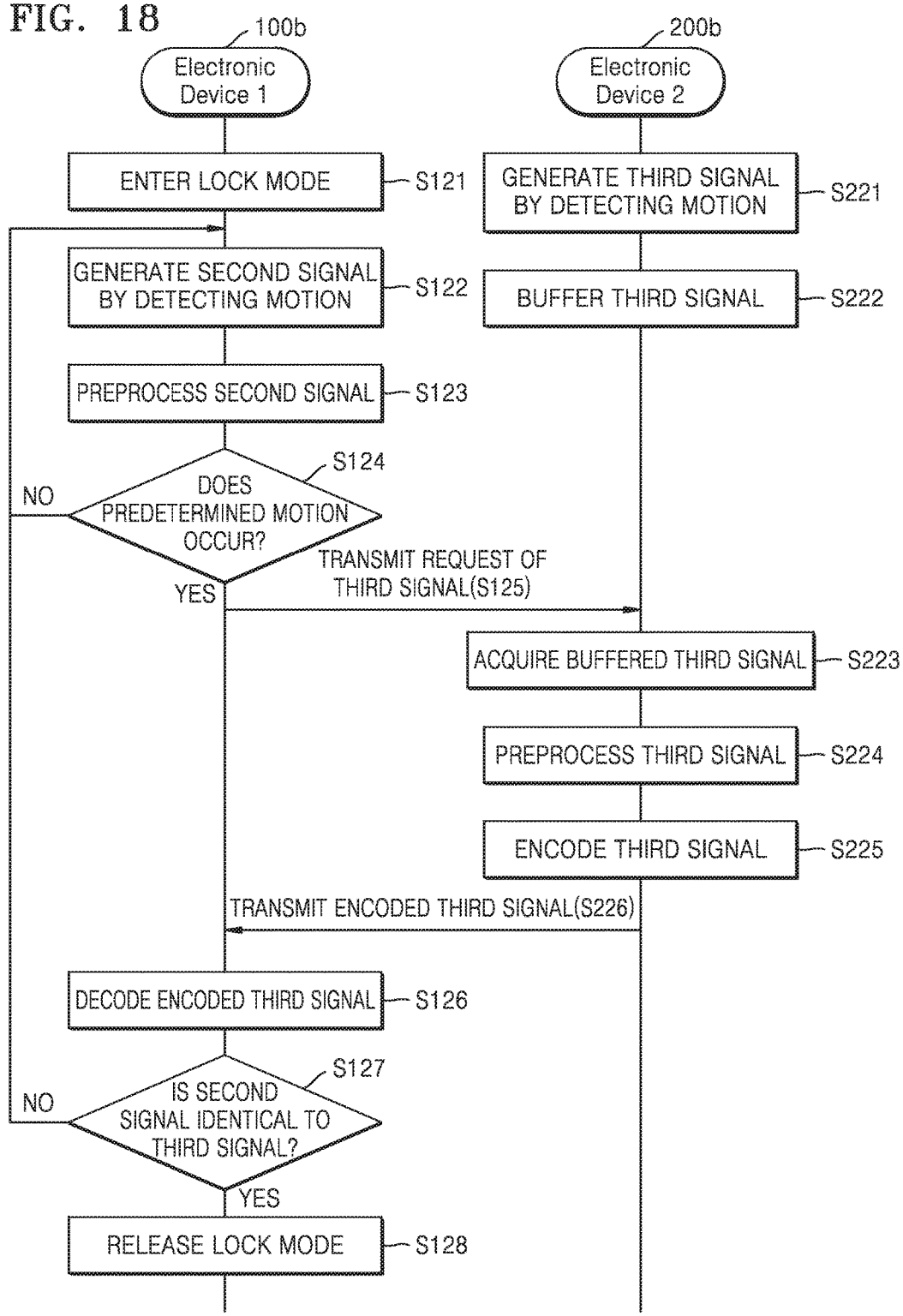
Figure 19:
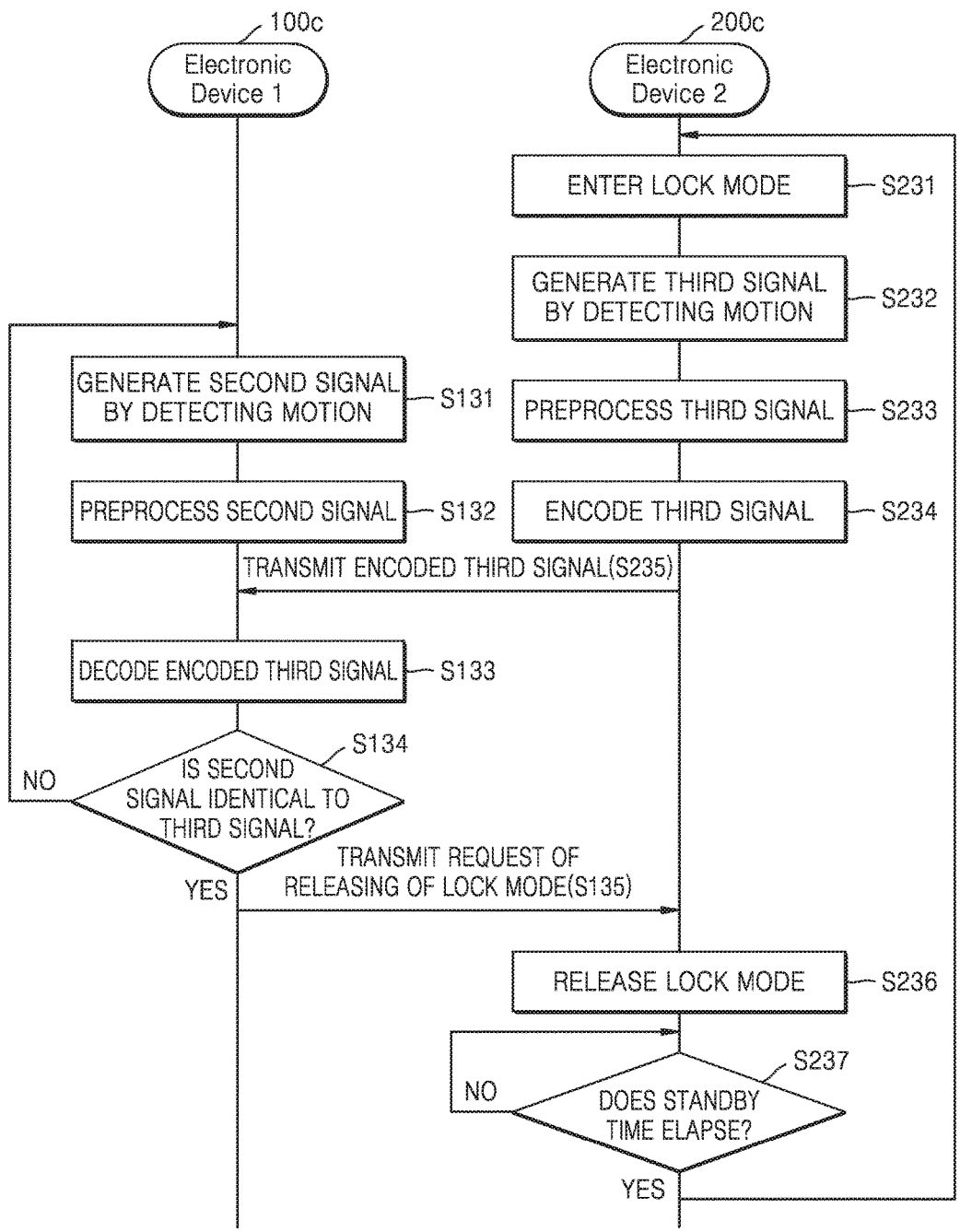

FIGS. 17, 18, and 19 are flowcharts illustrating operations performed by first and second electronic devices that perform predetermined functions selectively, according to example embodiments. In examples of FIGS. 17 and 19, it is assumed that a secure communication channel has been already formed between first electronic devices 100a, 100b, and 100c and second electronic devices 200a, 200b, and 200c, respectively, based on biomedical signals. As will be described below with reference to FIGS. 17 to 19, the user may easily release a lock mode via motions applied to the first electronic devices 100a, 100b, and 100c and the second electronic devices 200a, 200b, and 200c.

Referring to FIG. 17, a lock mode of the first electronic device 100a may be released based on motions detected by the first and second electronic devices 100a and 200a. As illustrated in FIG. 17, the first electronic device 100a may enter the lock mode (S111). The lock mode is a mode in which a function of the first electronic device 100a is limited to prevent inappropriate access of a user that is not a true user of the first electronic device 100a. The true user of the first electronic device 100a may release the lock mode by using authentication. User authentication may be provided according to example embodiments.

The first electronic device 100a may generate a second signal by detecting a motion (S112) and may preprocess the second signal (S113). Similarly, the second electronic device 200a may generate a third signal by detecting a motion (S211) and may preprocess the third signal (S212).

The second electronic device 200a may encode the third signal (S213) and may transmit the encoded third signal (S214). Encoding of the third signal may be performed using a secret key generated based on a signal generated by detecting a biomedical signal by the second electronic device 200a.

The first electronic device 100a may decode the encoded third signal (S114) and may compare the second signal with the third signal (S115). When the second signal and the third signal are not identical to each other, the first electronic device 100a may generate a second signal again by detecting a motion (S112). On the other hand, when the second signal and the third signal are substantially identical to each other, the first electronic device 100a may release the lock mode (S116). Next, the first electronic device 100a may determine whether a period in which there is no user's input exceeds a standby time (S117), and when the period exceeds the standby time, the first electronic device 100a may enter the lock mode (S111).

Referring to FIG. 18, the first electronic device 100b may request transmission of the third signal from the second electronic device 200b, and the second electronic device 200b may transmit a buffered third signal to the first electronic device 100b.

The first electronic device 100b may enter the lock mode (S121). The first electronic device 100b may generate a second signal by detecting a motion (S122) and may preprocess the second signal (S123). The first electronic device 100b may determine whether a predetermined motion occurs based on the second signal (S124), and when the predetermined motion occurs, the first electronic device 100b may transmit a request for the third signal to the second electronic device 200b (S125). On the other hand, when the predetermined motion does not occur, the first electronic device 100b may generate a second signal again by detecting a motion (S122).

The second electronic device 200b may generate a third signal by detecting a motion before receiving request of the third signal from the first electronic device 100b (S221) and may buffer the third signal (S222). That is, the second electronic device 200b may buffer the third signal according to the detected motion in preparation for receiving of request of the third signal from the first electronic device 100b. When request of the third signal is received from the first electronic device 100b, the second electronic device 200b may acquire the buffered third signal (S223) and may preprocess the third signal (S224). The buffered third signal may be a signal generated at a substantially similar time to a time when the first electronic device 100b generates the second signal. The second electronic device 200b may encode the third signal (S225) and may transmit the encoded third signal to the first electronic device 100b (S226).

The first electronic device 100b may decode the encoded third signal (S126) and may compare the second signal with the third signal (S127). When the second signal and the third signal are not substantially identical to each other, the first electronic device 100b may generate the second signal again by detecting a motion (S122). On the other hand, when the second signal and the third signal are substantially identical to each other, the first electronic device 100b may release the lock mode (S128).

Referring to FIG. 19, the first electronic device 100c may request releasing of the lock mode from the second electronic device 200c.

The first electronic device 100c may generate a second signal by detecting a motion (S131) and may preprocess the second signal (S132).

The second electronic device 200c may enter the lock mode (S231). The second electronic device 200c may generate a third signal by detecting a motion (S232) and may preprocess the third signal (S233). The second electronic device 200c may encode the third signal (S234) and may transmit the encoded third signal (S235).

The first electronic device 100c may decode the encoded third signal (S133) and may compare the second signal with the third signal (S134). When the second signal and the third signal are not substantially identical to each other, the first electronic device 100c may generate a second signal again by detecting a motion (S131). On the other hand, when the second signal and the third signal are substantially identical to each other, the first electronic device 100c may transmit request of releasing of the lock mode (S135).

The second electronic device 200c may release the lock mode in response to request of releasing of the lock mode received from the first electronic device 100c (S236), may determine whether a period in which there is no user's input exceeds the standby time (S237), and when the period exceeds the standby time, may enter the lock mode (S231).

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

While the inventive concept has been shown and described with reference to example embodiments thereof, it will be understood that various changes in form and details may be made therein without departing from the spirit and scope of the following claims.

What is claimed is:
1. An electronic device comprising:
a biomedical sensor configured to detect a biomedical signal, to generate a first signal indicatingthe detected biomedical signal;
a motion sensor configured to detect a motion of the electronic device, to generate a second signal indicatingthe motion that is detected;
a storage storing instructions; and
a processor configured to execute the instructions that are stored to:
generate a secret key for a secure communication channel with another electronic device, based on the first signal that is generated;
control to provide the secure communication channel with the other electronic device, using the generated secret key;
receive, from the other electronic device, a third signal indicating another motion of the other electronic device that is detected by the other electronic device;
determine whether the second signal that is generated corresponds to the third signal that is received;
based on the second signal that is generated being determined to correspond to the third signal that is received, perform a predetermined function;
receive a fourth signal indicating any one or any combination of radio frequency signals around the electronic device;
determine a triangular location of the electronic device, based on the received fourth signal; and
generate the secret key or determine whether to perform the predetermined function, further based on the determined triangular location.

2. The electronic device of claim 1, wherein the processor is further configured to execute the instructions that are stored to:
 extract interpulse intervals from the first signal; and
 generate the secret key, based on of the interpulse intervals that is extracted.

3. The electronic device of claim 1, wherein the processor is further configured to execute the instructions that are stored to:
 generate data by encoding the first signal;
 estimate entropy of the data that is generated; and
 in response to the estimated entropy being substantially greater than or equal to a predetermined value, generate the secret key, based on the data that is generated.

4. The electronic device of claim 1, wherein the processor is further configured to execute the instructions that are stored to generate the secret key, further based on the second signal that is generated.

5. The electronic device of claim 1, wherein the biomedical sensor comprises biomedical signal sensors configured to respectively detect different biomedical signals, and
 the biomedical sensor is further configured to generate the first signal, based on the detected different biomedical signals.

6. The electronic device of claim 1, wherein the processor is further configured to execute the instructions that are stored to:
 receive data through the secure communication channel; and
 generate the third signal by decoding the received data, using the generated key.

7. The electronic device of claim 1, wherein the processor is further configured to execute the instructions that are stored to determine whether the second signal that is generated corresponds to the third signal that is received in a frequency-domain.

8. The electronic device of claim 1, wherein the storage is configured to store a motion profile, and
 the processor is further configured to execute the instructions that are stored to determine whether to perform the predetermined function by comparing the motion that is detected corresponding to the second signal that is generated or the motion that is detected corresponding to the third signal that is received, with the stored motion profile.

9. The electronic device of claim 1, wherein the processor is further configured to execute the instructions that are stored to control to based on the motion that is detected corresponding to the second signal that is generated being a predetermined motion, control to transmit a request for the third signal, to the other electronic device.

10. The electronic device of claim 1, wherein the predetermined function is for releasing a lock mode of the electronic device.

11. The electronic device of claim 1, wherein the predetermined function is for controlling to transmit a signal for requesting a release of a lock mode of the electronic device, to the other electronic device.

12. The electronic device of claim 1, wherein the processor is further configured to execute the instructions that are stored to:
 synchronize the second signal that is generated and the third signal that is received, based on the received fourth signal; and
 determine whether to perform the predetermined function by comparing the second signal that is synchronized, with the third signal that is synchronized.

13. The electronic device of claim 1, wherein the electronic device is a mobile phone, and
 the other electronic device comprises a wearable electronic device.

14. The electronic device of claim 1, the processor is further configured to execute the instructions that are stored to:
 remove noise from the second signal that is generated and the third signal that is received;
 synchronize the second signal and the third signal from which the noise is removed; and
 determine whether to perform the predetermined function by comparing the second signal that is synchronized, with the third signal that is synchronized.

15. The electronic device of claim 1, wherein the storage is configured to store a personal profile of a user of the electronic device, and
 the processor is further configured to execute the instructions that are stored to:
 generate data by encoding the first signal;
 estimate entropy of the data that is generated, based on the stored personal profile; and
 predetermined value, generate the secret key, based on the data that is generated and the stored personal profile.

16. A method that is performed by an electronic device, the method comprising:
 detecting a biomedical signal, to generate a first signal indicatingthe detected biomedical signal;
 detecting a motion of the electronic device, to generate a second signal indicatingthe motion that is detected;
 generating a secret key for a secure communication channel with another electronic device, based on the first signal that is generated;
 providing the secure communication channel with the other electronic device, using the generated secret key;
 receiving, from the other electronic device, a third signal indicating another motion of the other electronic device that is detected by the other electronic device;
 determining whether the second signal that is generated corresponds to the third signal that is received;
 based on the second signal that is generated being determined to correspond to the third signal that is received, performing a predetermined function;
 receiving a fourth signal indicating any one or any combination of radio frequency signals around the electronic device;
 determining a triangular location of the electronic device, based on the received fourth signal; and
 generating the secret key or determine whether to perform the predetermined function, further based on the determined triangular location.

17. An electronic device comprising:
 a biomedical sensor configured to detect a biomedical signal;
 a motion sensor configured to detect a first motion signal of the electronic device;
 a storage storing instructions; and
 a processor configured to execute the instructions that are stored to:
 generate a secret key for a secure communication channel with another electronic device, based on the detected biomedical signal;
 control to provide the secure communication channel with the other electronic device, using the generated secret key;

enter a lock mode of the electronic device;
receive, from the other electronic device, a second motion signal of the other electronic device that is detected by the other electronic device;
decode the received second motion signal, using the generated secret key;
determine whether the detected first motion signal corresponds to the second motion signal that is decoded;
based on the detected first motion signal being determined to correspond to the second motion signal that is decoded, release the entered lock mode;
receive an input signal indicating any one or any combination of radio frequency signals around the electronic device;
determine a triangular location of the electronic device, based on the received input signal; and
generate the secret key or determine whether to release the entered lock mode, further based on the determined triangular location.

* * * * *